US010201011B2

United States Patent
Wang et al.

(10) Patent No.: US 10,201,011 B2
(45) Date of Patent: Feb. 5, 2019

(54) METHOD, DEVICE, AND COMMUNICATIONS SYSTEM FOR PERFORMING DATA COMMUNICATION BY USING UNLICENSED SPECTRUM

(71) Applicant: Huawei Technologies Co., Ltd., Shenzhen, Guangdong (CN)

(72) Inventors: Yi Wang, Shanghai (CN); Guangzhu Zeng, Hangzhou (CN); Yungang Li, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 31 days.

(21) Appl. No.: 15/299,748

(22) Filed: Oct. 21, 2016

(65) Prior Publication Data

US 2017/0041950 A1 Feb. 9, 2017

Related U.S. Application Data

(63) Continuation of application No. PCT/CN2014/075911, filed on Apr. 22, 2014.

(51) Int. Cl.
| | |
|---|---|
| H04W 72/02 | (2009.01) |
| H04W 74/00 | (2009.01) |
| H04W 76/10 | (2018.01) |
| H04W 28/08 | (2009.01) |
| H04W 16/14 | (2009.01) |
| H04W 48/10 | (2009.01) |

(Continued)

(52) U.S. Cl.
CPC ......... *H04W 74/006* (2013.01); *H04W 16/14* (2013.01); *H04W 28/08* (2013.01); *H04W 48/10* (2013.01); *H04W 72/02* (2013.01); *H04W 76/10* (2018.02); *H04W 74/004* (2013.01); *H04W 84/042* (2013.01); *H04W 84/12* (2013.01)

(58) Field of Classification Search
CPC ...... H04W 28/08; H04W 88/06; H04W 72/02
See application file for complete search history.

(56) References Cited

U.S. PATENT DOCUMENTS

| | | | | |
|---|---|---|---|---|
| 2010/0112980 A1* | 5/2010 | Horn | ..................... | H04W 48/20 |
| | | | | 455/411 |
| 2013/0143502 A1* | 6/2013 | Kazmi | .................. | H04W 88/06 |
| | | | | 455/62 |
| 2017/0041950 A1* | 2/2017 | Wang | ..................... | H04W 76/10 |

FOREIGN PATENT DOCUMENTS

| | | |
|---|---|---|
| CN | 102232307 A | 11/2011 |
| CN | 102812772 A | 12/2012 |

(Continued)

*Primary Examiner* — Raj Jain

(57) ABSTRACT

Embodiments of the present invention provide a method, a device, and a communications system for performing data communication by using an unlicensed spectrum. In an embodiment, a base station determines to use an unlicensed spectrum to perform data communication, and sends mode request information to a terminal. The terminal receives the mode request message sent by the base station and determines, according to a preset configuration table, whether to use the unlicensed spectrum to perform data communication. When determining to use the unlicensed spectrum to perform data communication, the terminal sends a mode acknowledgement message to the base station. The base station receives the mode acknowledgement information sent by the terminal, and the terminal performs data communication in a first unlicensed frequency band with the base station.

12 Claims, 15 Drawing Sheets

(51) Int. Cl.
    *H04W 84/04*     (2009.01)
    *H04W 84/12*     (2009.01)

(56) References Cited

FOREIGN PATENT DOCUMENTS

| | | |
|---|---|---|
| CN | 103188711 A | 7/2013 |
| CN | 103517456 A | 1/2014 |
| CN | 103582156 A | 2/2014 |

* cited by examiner

METHOD, DEVICE, AND COMMUNICATIONS SYSTEM FOR PERFORMING DATA COMMUNICATION BY USING UNLICENSED SPECTRUM

CROSS-REFERENCE TO RELATED APPLICATIONS

This application is a continuation of International Application No. PCT/CN2014/075911, filed on Apr. 22, 2014, the disclosure of which is hereby incorporated by reference in its entirety.

TECHNICAL FIELD

The present invention relates to the field of wireless communications technologies, and in particular, to a method, a device, and a communications system for performing data communication by using an unlicensed spectrum.

BACKGROUND

A mobile operator always uses a licensed frequency band for cellular access, and uses various technology innovations to improve spectrum utilization of the existing licensed spectrum. However, with development of communications technologies, pressure for expansion of a mobile broadband network becomes heavier, and a bottleneck is encountered when technology innovations are used to improve spectrum utilization of the existing licensed spectrum. In this case, mobile communications industries at home and abroad begin to consider using more spectrum resources to improve spectrum utilization. For example, using an unlicensed spectrum to perform data communication in a cellular system, that is, simultaneously using a licensed spectrum and an unlicensed spectrum to access the cellular system, so as to achieve higher access efficiency, higher reliability, and better mobility. However, in the cellular system, random access to the unlicensed spectrum easily causes interference between the licensed spectrum and the unlicensed spectrum. Therefore, how to schedule an unlicensed spectrum resource to perform data communication becomes a primary problem to be resolved.

SUMMARY

Embodiments of the present invention provide a method, a device, and a communications system for performing data communication by using an unlicensed spectrum, so that through negotiation between a base station and a terminal or among a mobility management entity, a base station, and a terminal, an unlicensed spectrum resource is properly scheduled for data communication in a cellular system.

To achieve the foregoing objective, the following technical solutions are adopted in the embodiments of the present invention:

According to a first aspect, an embodiment of the present invention provides a method for performing data communication by using an unlicensed spectrum, where the method includes:

receiving, by a terminal, a mode request message sent by a base station, where the mode request message is used to request the terminal to use an unlicensed spectrum to perform data communication;

determining, by the terminal according to a preset configuration table, whether the terminal uses the unlicensed spectrum to perform data communication;

if determining to use the unlicensed spectrum to perform data communication, sending, by the terminal, a mode acknowledgement message to the base station, where the mode acknowledgement message is used to indicate that the terminal determines to use the unlicensed spectrum to perform data communication; and performing, by the terminal, communication in a first unlicensed frequency band with the base station, where the first unlicensed frequency band is any unlicensed frequency band in an intersection of all unlicensed frequency bands supported by the terminal and all unlicensed frequency bands supported by the base station.

With reference to the first aspect, in a first possible implementation manner of the first aspect, the preset configuration table includes a first option, a second option, and a third option, where the first option includes an enabling status of an unlicensed spectrum mode, the second option includes a preset priority order of the unlicensed spectrum mode and a first communication mode, and the third option includes a preset priority order of, corresponding to a data service type, the unlicensed spectrum mode and the first communication mode, where the first communication mode includes a licensed spectrum mode and a WiFi mode, or a licensed spectrum mode, or a WiFi mode; and correspondingly, the determining, by the terminal according to a preset configuration table, whether the terminal uses the unlicensed spectrum to perform data communication, includes:

querying the first option in the preset configuration table;

if the unlicensed spectrum mode in the first option is in an enabled state, querying the second option or the third option in the preset configuration table; and if the unlicensed spectrum mode in all modes that are in enabled states in the second option has a highest priority, or if the unlicensed spectrum mode in all modes that are in enabled states in the priority order corresponding to the data service type in the third option has a highest priority, determining that the terminal uses the unlicensed spectrum to perform data communication.

With reference to the first aspect or the first possible implementation manner of the first aspect, in a second possible implementation manner of the first aspect, the first unlicensed frequency band is determined by the terminal, the mode acknowledgement message includes the first unlicensed frequency band, and the mode request message includes all the unlicensed frequency bands supported by the base station; and correspondingly, after the determining, by the terminal, to use the unlicensed spectrum to perform data communication, and before the sending a mode acknowledgement message to the base station, the method further includes:

selecting, by the terminal, the first unlicensed frequency band from the intersection of all the unlicensed frequency bands supported by the terminal and all the unlicensed frequency bands supported by the base station.

With reference to the second possible implementation manner of the first aspect, in a third possible implementation manner of the first aspect, before the receiving a mode request message sent by a base station, the method further includes:

receiving, by the terminal, a system broadcast message sent by the base station, where the system broadcast message is used to indicate that the base station supports the unlicensed spectrum for performing data communication; and sending, by the terminal, a report message to the base station, so that the base station sends the mode request message to the terminal, where the report message is used to indicate that the terminal supports the unlicensed spectrum for performing data communication.

With reference to the first aspect or the first possible implementation manner of the first aspect, in a fourth possible implementation manner of the first aspect, the first unlicensed frequency band is determined by a mobility management entity, and the mode request message includes the first unlicensed frequency band; and correspondingly, before the receiving a mode request message sent by a base station, the method further includes:

sending, by the terminal, capability information of the terminal to the base station, so that the base station sends the capability information of the terminal and capability information of the base station to the mobility management entity, and further that the mobility management entity determines the first unlicensed frequency band according to the capability information of the terminal and the capability information of the base station, where the capability information of the terminal includes all the unlicensed frequency bands supported by the terminal, and the capability information of the base station includes all the unlicensed frequency bands supported by the base station.

With reference to the fourth possible implementation manner of the first aspect, in a fifth possible implementation manner of the first aspect, after the sending, by the terminal, capability information of the terminal to the base station, and before the receiving a mode request message sent by a base station, the method further includes:

sending, by the terminal, a service request message to the base station, so that the base station sends the service request message to the mobility management entity, and further that the mobility management entity sends the mode request message to the base station, where the service request message includes a message about pre-using the unlicensed spectrum to perform data communication by the terminal.

According to a second aspect, an embodiment of the present invention provides a method for performing data communication by using an unlicensed spectrum, where the method includes:

determining, by a base station, to use an unlicensed spectrum to perform data communication;

sending, by the base station, mode request information to a terminal, where the mode request information is used to request the terminal to use the unlicensed spectrum to perform data communication;

receiving, by the base station, mode acknowledgement information sent by the terminal, where the mode acknowledgement message is used to indicate that the terminal determines to use the unlicensed spectrum to perform data communication; and performing, by the base station, data communication in a first unlicensed frequency band with the terminal, where the first unlicensed frequency band is any unlicensed frequency band in an intersection of all unlicensed frequency bands supported by the terminal and all unlicensed frequency bands supported by the base station.

With reference to the second aspect, in a first possible implementation manner of the second aspect, the determining, by a base station, to use an unlicensed spectrum to perform data communication, includes:

detecting, by the base station, an unused licensed spectrum resource; and if the unused licensed spectrum resource is smaller than a spectrum resource required for performing data communication with the terminal, determining, by the base station, to use the unlicensed spectrum to perform data communication.

With reference to any implementation manner of the second aspect or the first possible implementation manner of the second aspect, in a second possible implementation manner of the second aspect, the first unlicensed frequency band is determined by the terminal, and the mode acknowledgement message includes the first unlicensed frequency band; and correspondingly, before the base station determines to use the unlicensed spectrum to perform data communication, the method further includes:

sending, by the base station, a system broadcast message to the terminal, where the system broadcast message is used to indicate that the base station supports the unlicensed spectrum for performing data communication; and receiving, by the base station, a report message sent by the terminal, where the report message is used to indicate that the terminal supports the unlicensed spectrum for performing data communication.

With reference to any implementation manner of the second aspect or the first possible implementation manner of the second aspect, in a third possible implementation manner of the second aspect, the first unlicensed frequency band is determined by a mobility management entity, and the mode request message includes the first unlicensed frequency band; and correspondingly, before the base station determines to use the unlicensed spectrum to perform data communication, the method further includes:

receiving, by the base station, capability information of the terminal that is sent by the terminal, and sending the capability information of the terminal and capability information of the base station to the mobility management entity, so that the mobility management entity determines the first unlicensed frequency band according to the capability information of the base station and the capability information of the terminal, where the capability information of the terminal includes all the unlicensed frequency bands supported by the terminal, and the capability information of the base station includes all the unlicensed frequency bands supported by the base station; and receiving, by the base station, the mode request message sent by the mobility management entity.

With reference to the third possible implementation manner of the second aspect, in a fourth possible implementation manner of the second aspect, after the base station receives the mode acknowledgement message sent by the terminal, and before data communication is performed in the first unlicensed frequency band with the terminal, the method further includes:

sending, by the base station, the mode acknowledgement message to the mobility management entity, so that the mobility management entity establishes a data transmission link, where the mode acknowledgement message is used to indicate that the base station and the terminal determine to use the unlicensed spectrum to perform data communication.

With reference to the third possible implementation manner of the second aspect or the fourth possible implementation manner of the second aspect, in a fifth possible implementation manner of the second aspect, after the base station sends the capability information of the terminal and the capability information of the base station to the mobility management entity, and before the mode request message sent by the mobility management entity is received, the method further includes:

receiving, by the base station, a service request message sent by the terminal, and sending the service request message to the mobility management entity, so that the mobility management entity sends the mode request message to the base station, where the service request message includes a message about pre-using the unlicensed spectrum to perform data communication by the terminal.

According to a third aspect, an embodiment of the present invention provides a method for performing data communication by using an unlicensed spectrum, where the method includes:

receiving, by a mobility management entity, capability information of the terminal and capability information of a base station that are sent by the base station, and storing the capability information of the terminal and the capability information of the base station, where the capability information of the terminal includes all unlicensed frequency bands supported by the terminal, and the capability information of the base station includes all unlicensed frequency bands supported by the base station;

determining, by the mobility management entity, a first unlicensed frequency band according to the capability information of the terminal and the capability information of the base station;

sending, by the mobility management entity, a mode request message to the base station, so that the base station determines to use an unlicensed spectrum to perform data communication and sends the mode request message to the terminal, where the mode request message includes the first unlicensed frequency band;

receiving, by the mobility management entity, a mode acknowledgement message sent by the base station, where the mode acknowledgement message is used to indicate that the base station and the terminal determine to use the unlicensed spectrum to perform data communication; and establishing, by the mobility management entity, a data transmission link, so that the base station and the terminal perform data communication in the first unlicensed frequency band.

With reference to the third aspect, in a first possible implementation manner of the third aspect, after the mobility management entity determines the first unlicensed frequency band, and before the mode request message is sent to the base station, the method further includes:

receiving, by the mobility management entity, a service request message sent by the base station, where the service request message is sent by the terminal, and the service request message includes a message about pre-using the unlicensed spectrum to perform data communication by the terminal.

According to a fourth aspect, an embodiment of the present invention provides a terminal, including:

a first receiving module, configured to receive a mode request message sent by a base station, where the mode request message is used to request the terminal to use an unlicensed spectrum to perform data communication;

a determining module, configured to determine, according to a preset configuration table, whether the terminal uses the unlicensed spectrum to perform data communication;

a first sending module, configured to send, if the terminal determines to use the unlicensed spectrum to perform data communication, a mode acknowledgement message to the base station, where the mode acknowledgement message is used to indicate that the terminal determines to use the unlicensed spectrum to perform data communication; and a communications module, configured to perform data communication in a first unlicensed frequency band with the base station, where the first unlicensed frequency band is any unlicensed frequency band in an intersection of all unlicensed frequency bands supported by the terminal and all unlicensed frequency bands supported by the base station.

With reference to the fourth aspect, in a first possible implementation manner of the fourth aspect, the preset configuration table includes a first option, a second option, and a third option, where the first option includes an enabling status of an unlicensed spectrum mode, the second option includes a preset priority order of the unlicensed spectrum mode and a first communication mode, and the third option includes a preset priority order of, corresponding to a data service type, the unlicensed spectrum mode and the first communication mode, where the first communication mode includes a licensed spectrum mode and a WiFi mode, or a licensed spectrum mode, or a WiFi mode; and correspondingly, the determining module is specifically configured to:

query the first option in the preset configuration table;

if the unlicensed spectrum mode in the first option is in an enabled state, view the second option or the third option in the preset configuration table; and if the unlicensed spectrum mode in all modes that are in enabled states in the second option has a highest priority, or if the unlicensed spectrum mode in all modes that are in enabled states in the priority order corresponding to the data service type in the third option has a highest priority, determine that the terminal uses the unlicensed spectrum to perform data communication.

With reference to any implementation manner of the fourth aspect or the first possible implementation manner of the fourth aspect, in a second possible implementation manner of the fourth aspect, the first unlicensed frequency band is determined by the terminal, the mode acknowledgement message includes the first unlicensed frequency band, and the mode request message includes all the unlicensed frequency bands supported by the base station; and correspondingly, the terminal further includes:

a selecting module, configured to select, after the determining module determines that the terminal uses the unlicensed spectrum to perform data communication, and before the first sending module sends the mode acknowledgement message to the base station, the first unlicensed frequency band from the intersection of all the unlicensed frequency bands supported by the terminal and all the unlicensed frequency bands supported by the base station.

With reference to the second possible implementation manner of the fourth aspect, in a third possible implementation manner of the fourth aspect, the terminal further includes:

a second receiving module, configured to receive, before the first receiving module receives the mode request message sent by the base station, a system broadcast message sent by the base station, where the system broadcast message is used to indicate that the base station supports the unlicensed spectrum for performing data communication; and a second sending module, configured to send a report message to the base station, so that the base station sends the mode request message to the terminal, where the report message is used to indicate that the terminal supports the unlicensed spectrum for performing data communication.

With reference to the fourth aspect or the first possible implementation manner of the fourth aspect, in a fourth possible implementation manner of the fourth aspect, the first unlicensed frequency band is determined by a mobility management entity, and the mode request message includes the first unlicensed frequency band; and correspondingly, the terminal further includes:

a third sending module, configured to send, before the first receiving module receives the mode request message sent by the base station, capability information of the terminal to the base station, so that the base station sends the capability information of the terminal and capability information of the base station to the mobility management entity, and further that the mobility management entity determines the first unlicensed frequency band according to the capability information of the terminal and the capability information of the base station, where the capability information of the terminal includes all the unlicensed frequency bands supported by the terminal, and the capability information of the base station includes all the unlicensed frequency bands supported by the base station.

With reference to the fourth possible implementation manner of the fourth aspect, in a fifth possible implementation manner of the fourth aspect, the terminal further includes:

a fourth sending module, configured to send, after the third sending module sends the capability information of the terminal, and before the first receiving module receives the mode request message sent by the base station, a service request message to the base station, so that the base station sends the service request message to the mobility management entity, and further that the mobility management entity sends the mode request message to the base station, where the service request message includes a message about pre-using the unlicensed spectrum to perform data communication by the terminal.

According to a fifth aspect, an embodiment of the present invention provides a base station, including:

a determining module, configured to determine to use an unlicensed spectrum to perform data communication;

a first sending module, configured to send mode request information to a terminal, where the mode request information is used to request the terminal to use the unlicensed spectrum to perform data communication;

a first receiving module, configured to receive mode acknowledgement information sent by the terminal, where the mode acknowledgement message is used to indicate that the terminal determines to use the unlicensed spectrum to perform data communication; and a communications module, configured to perform data communication in a first unlicensed frequency band with the terminal, where the first unlicensed frequency band is any unlicensed frequency band in an intersection of all unlicensed frequency bands supported by the terminal and all unlicensed frequency bands supported by the base station.

With reference to the fifth aspect, in a first possible implementation manner of the fifth aspect, the determining module is specifically configured to:

detect an unused licensed spectrum resource; and if the unused licensed spectrum resource is smaller than a spectrum resource required for performing data communication with the terminal, determine to use the unlicensed spectrum to perform data communication.

With reference to the fifth aspect or the first possible implementation manner of the fifth aspect, in a second possible implementation manner of the fifth aspect, the first unlicensed frequency band is determined by the terminal, and the mode acknowledgement message includes the first unlicensed frequency band; and correspondingly, the base station further includes:

a second sending module, configured to send, before the determining module determines to use the unlicensed spectrum to perform data communication, a system broadcast message to the terminal, where the system broadcast message is used to indicate that the base station supports the unlicensed spectrum for performing data communication; and a second receiving module, configured to receive a report message sent by the terminal, where the report message is used to indicate that the terminal supports the unlicensed spectrum for performing data communication.

With reference to any implementation manner of the fifth aspect or the first possible implementation manner of the fifth aspect, in a third possible implementation manner of the fifth aspect, the first unlicensed frequency band is determined by a mobility management entity, and the mode request message includes the first unlicensed frequency band; and correspondingly, the base station further includes:

a third receiving module, configured to receive, before the determining module determines to use the unlicensed spectrum to perform data communication, capability information of the terminal that is sent by the terminal;

a third sending module, configured to send the capability information of the terminal and capability information of the base station to the mobility management entity, so that the mobility management entity determines the first unlicensed frequency band according to the capability information of the base station and the capability information of the terminal, where the capability information of the terminal includes all the unlicensed frequency bands supported by the terminal, and the capability information of the base station includes all the unlicensed frequency bands supported by the base station; and a fourth receiving module, configured to receive the mode request message sent by the mobility management entity.

With reference to the third possible implementation manner of the fifth aspect, in a fourth possible implementation manner of the fifth aspect, the base station further includes:

a fourth sending module, configured to send, after the first receiving module receives the mode acknowledgement message sent by the terminal, and before data communication is performed in the first unlicensed frequency band with the terminal, the mode acknowledgement message to the mobility management entity, so that the mobility management entity establishes a data transmission link, where the mode acknowledgement message is used to indicate that the base station and the terminal determine to use the unlicensed spectrum to perform data communication.

With reference to the fourth possible implementation manner of the fifth aspect, in a fifth possible implementation manner of the fifth aspect, the base station further includes:

a fifth receiving module, configured to receive, after the third sending module sends the capability information of the terminal and the capability information of the base station to the mobility management entity, and before the fourth receiving module receives the mode request message sent by the mobility management entity, a service request message sent by the terminal; and a fifth sending module, configured to send the service request message to the mobility management entity, so that the mobility management entity sends the mode request message to the base station; where the service request message includes a message about pre-using the unlicensed spectrum to perform data communication by the terminal.

According to a sixth aspect, an embodiment of the present invention provides a mobility management entity, including:

a first receiving module, configured to receive capability information of the terminal and capability information of a base station that are sent by the base station, where the capability information of the terminal includes all unlicensed frequency bands supported by the terminal, and the capability information of the base station includes all unlicensed frequency bands supported by the base station;

a determining module, configured to determine a first unlicensed frequency band according to the capability information of the terminal and the capability information of the base station;

a first sending module, configured to send a mode request message to the base station, so that the base station determines to use an unlicensed spectrum to perform data communication and sends the mode request message to the terminal, where the mode request message includes the first unlicensed frequency band;

a second receiving module, configured to receive a mode acknowledgement message sent by the base station, where the mode acknowledgement message is used to indicate that the base station and the terminal determine to use the unlicensed spectrum to perform data communication; and an establishing module, configured to establish a data transmission link, so that the base station and the terminal perform data communication in the first unlicensed frequency band.

With reference to the sixth aspect, in a first possible implementation manner of the sixth aspect, the mobility management entity further includes:

a third receiving module, configured to receive, after the determining module determines the first unlicensed frequency band, and before the first sending module sends the mode request message to the base station, a service request message sent by the base station, where the service request message is sent by the terminal, and the service request message includes a message about pre-using the unlicensed spectrum to perform data communication by the terminal.

According to a seventh aspect, an embodiment of the present invention provides a communications system, including the terminal according to any implementation manner of the fourth aspect to the fifth possible implementation manner of the fourth aspect, the base station according to any implementation manner of the fifth aspect to the fifth possible implementation manner of the fifth aspect, and the mobility management entity according to any implementation manner of the sixth aspect or the first possible implementation manner of the sixth aspect.

According to an eighth aspect, an embodiment of the present invention provides a terminal, including:

a communications unit, configured to receive a mode request message sent by a base station, where the mode request message is used to request the terminal to use an unlicensed spectrum to perform data communication; and a processor, configured to determine, according to a preset configuration table, whether the terminal uses the unlicensed spectrum to perform data communication; where the communications unit is further configured to: if the terminal determines to use the unlicensed spectrum to perform data communication, send a mode acknowledgement message to the base station, where the mode acknowledgement message is used to indicate that the terminal determines to use the unlicensed spectrum to perform data communication; and perform data communication in a first unlicensed frequency band with the base station, where the first unlicensed frequency band is any unlicensed frequency band in an intersection of all unlicensed frequency bands supported by the terminal and all unlicensed frequency bands supported by the base station.

With reference to the eighth aspect, in a first possible implementation manner of the eighth aspect, the preset configuration table includes a first option, a second option, and a third option, where the first option includes an enabling status of an unlicensed spectrum mode, the second option includes a preset priority order of the unlicensed spectrum mode and a first communication mode, and the third option includes a preset priority order of, corresponding to a data service type, the unlicensed spectrum mode and the first communication mode, where the first communication mode includes a licensed spectrum mode and a WiFi mode, or a licensed spectrum mode, or a WiFi mode; and correspondingly, the processor is specifically configured to:

query the first option in the preset configuration table;

if the unlicensed spectrum mode in the first option is in an enabled state, view the second option or the third option in the preset configuration table; and if the unlicensed spectrum mode in all modes that are in enabled states in the second option has a highest priority, or if the unlicensed spectrum mode in all modes that are in enabled states in the priority order corresponding to the data service type in the third option has a highest priority, determine that the terminal uses the unlicensed spectrum to perform data communication.

With reference to any implementation manner of the eighth aspect or the first possible implementation manner of the eighth aspect, in a second possible implementation manner of the eighth aspect, the first unlicensed frequency band is determined by the terminal, the mode acknowledgement message includes the first unlicensed frequency band, and the mode request message includes all the unlicensed frequency bands supported by the base station; and correspondingly, the processor is further configured to:

after the processor determines that the terminal uses the unlicensed spectrum to perform data communication, and before the communications unit sends the mode acknowledgement message to the base station, select the first unlicensed frequency band from the intersection of all the unlicensed frequency bands supported by the terminal and all the unlicensed frequency bands supported by the base station.

With reference to the second possible implementation manner of the eighth aspect, in a third possible implementation manner of the eighth aspect, the communications unit is further configured to:

before the receiving a mode request message sent by a base station, receive a system broadcast message sent by the base station, where the system broadcast message is used to indicate that the base station supports the unlicensed spectrum for performing data communication; and send a report message to the base station, so that the base station sends the mode request message to the terminal, where the report message is used to indicate that the terminal supports the unlicensed spectrum for performing data communication.

With reference to the eighth aspect or the first possible implementation manner of the eighth aspect, in a fourth possible implementation manner of the eighth aspect, the first unlicensed frequency band is determined by a mobility management entity, and the mode request message includes the first unlicensed frequency band; and correspondingly, the communications unit is further configured to send, before the receiving a mode request message sent by a base station, capability information of the terminal to the base station, so that the base station sends the capability information of the terminal and capability information of the base station to the mobility management entity, and further that the mobility management entity determines the first unlicensed frequency band according to the capability information of the terminal and the capability information of the base station and sends the mode request message to the base station, where the capability information of the terminal includes all the unlicensed frequency bands supported by the terminal, and the capability information of the base station includes all the unlicensed frequency bands supported by the base station.

With reference to the fourth possible implementation manner of the eighth aspect, in a fifth possible implementation manner of the eighth aspect, the communications unit is further configured to:

after the communications unit sends the capability information of the terminal, and before the mode request message sent by the base station is received, send a service request message to the base station, so that the base station sends the service request message to the mobility management entity, and further that the mobility management entity sends the mode request message to the base station, where the service request message includes a message about pre-using the unlicensed spectrum to perform data communication by the terminal.

According to a ninth aspect, an embodiment of the present invention provides a base station, including:

a processor, configured to determine to use an unlicensed spectrum to perform data communication; and a communications unit, configured to send mode request information to a terminal, where the mode request information is used to request the terminal to use the unlicensed spectrum to perform data communication;

receive mode acknowledgement information sent by the terminal, where the mode acknowledgement message is used to indicate that the terminal determines to use the unlicensed spectrum to perform data communication; and perform data communication in a first unlicensed frequency band with the terminal, where the first unlicensed frequency band is any unlicensed frequency band in an intersection of all unlicensed frequency bands supported by the terminal and all unlicensed frequency bands supported by the base station.

With reference to the ninth aspect, in a first possible implementation manner of the ninth aspect, the processor is specifically configured to:

detect an unused licensed spectrum resource; and if the unused licensed spectrum resource is smaller than a spectrum resource required for performing data communication with the terminal, determine to use the unlicensed spectrum to perform data communication.

With reference to any implementation manner of the ninth aspect or the first possible implementation manner of the ninth aspect, in a second possible implementation manner of the ninth aspect, the first unlicensed frequency band is determined by the terminal, and the mode acknowledgement message includes the first unlicensed frequency band; and correspondingly, the communications unit is further configured to:

before the processor determines to use the unlicensed spectrum to perform data communication, send a system broadcast message to the terminal, where the system broadcast message is used to indicate that the base station supports the unlicensed spectrum for performing data communication; and receive a report message sent by the terminal, where the report message is used to indicate that the terminal supports the unlicensed spectrum for performing data communication.

With reference to any implementation manner of the ninth aspect or the first possible implementation manner of the ninth aspect, in a third possible implementation manner of the ninth aspect, the first unlicensed frequency band is determined by a mobility management entity, and the mode request message includes the first unlicensed frequency band; and correspondingly, the communications unit is further configured to:

before the processor determines to use the unlicensed spectrum to perform data communication, receive capability information of the terminal that is sent by the terminal;

send the capability information of the terminal and capability information of the base station to the mobility management entity, so that the mobility management entity determines the first unlicensed frequency band according to the capability information of the base station and the capability information of the terminal, where the capability information of the terminal includes all the unlicensed frequency bands supported by the terminal, and the capability information of the base station includes all the unlicensed frequency bands supported by the base station; and receive the mode request message sent by the mobility management entity.

With reference to the third possible implementation manner of the ninth aspect, in a fourth possible implementation manner of the ninth aspect, the communications unit is further configured to:

after the communications unit receives the mode acknowledgement message sent by the terminal, and before data communication is performed in the first unlicensed frequency band with the terminal, send the mode acknowledgement message to the mobility management entity, so that the mobility management entity establishes a data transmission link, where the mode acknowledgement message is used to indicate that the base station and the terminal determine to use the unlicensed spectrum to perform data communication.

With reference to the fourth possible implementation manner of the ninth aspect, in a fifth possible implementation manner of the ninth aspect, the communications unit is further configured to:

after the communications unit sends the capability information of the terminal and the capability information of the base station to the mobility management entity, and before the mode request message sent by the mobility management entity is received, receive a service request message sent by the terminal; and send the service request message to the mobility management entity, so that the mobility management entity sends the mode request message to the base station; where the service request message includes a message about pre-using the unlicensed spectrum to perform data communication by the terminal.

According to a tenth aspect, an embodiment of the present invention provides a mobility management entity, including:

a communications unit, configured to receive capability information of the terminal and capability information of a base station that are sent by the base station, where the capability information of the terminal includes all unlicensed frequency bands supported by the terminal, and the capability information of the base station includes all unlicensed frequency bands supported by the base station; and a processor, configured to determine a first unlicensed frequency band according to the capability information of the terminal and the capability information of the base station; where the communications unit is further configured to send a mode request message to the base station, so that the base station determines to use the unlicensed spectrum to perform data communication and sends the mode request message to the terminal, where the mode request message includes the first unlicensed frequency band; and receive a mode acknowledgement message sent by the base station, where the mode acknowledgement message is used to indicate that the base station and the terminal determine to use the unlicensed spectrum to perform data communication; and the processor is further configured to establish a data transmission link, so that the base station and the terminal perform data communication in the first unlicensed frequency band.

With reference to the tenth aspect, in a first possible implementation manner of the tenth aspect, the communications unit is further configured to:

after the processor determines the first unlicensed frequency band, and before the communications unit sends the mode request message to the base station, receive a service request message sent by the base station, where the service request message is sent by the terminal, and the service request message includes a message about pre-using the unlicensed spectrum to perform data communication by the terminal.

According to an eleventh aspect, an embodiment of the present invention provides a communications system, including the terminal according to any implementation manner of the eighth aspect to the fifth possible implementation manner of the eighth aspect, the base station according to any implementation manner of the ninth aspect to the fifth possible implementation manner of the ninth aspect, and the mobility management entity according to any implementation manner of the tenth aspect or the first possible implementation manner of the tenth aspect.

As can be learned from above, in the method, device, and communications system for performing data communication by using an unlicensed spectrum according to the embodiments of the present invention, a base station determines to use an unlicensed spectrum to perform data communication, and sends mode request information to a terminal; the terminal receives the mode request message sent by the base station, and determines, according to a preset configuration table, whether the terminal uses the unlicensed spectrum to perform data communication; if determining to use the unlicensed spectrum to perform data communication, the terminal sends a mode acknowledgement message to the base station; and the base station receives the mode acknowledgement information sent by the terminal, and performs data communication in a first unlicensed frequency band with the terminal, where the first unlicensed frequency band is any unlicensed frequency band in an intersection of all unlicensed frequency bands supported by the terminal and all unlicensed frequency bands supported by the base station, and is determined by the terminal or a mobility management entity. Therefore, through negotiation between the base station and the terminal or among the mobility management entity, the base station, and the terminal, an unlicensed spectrum resource is properly scheduled for data communication in a cellular system, and a problem that random access to the unlicensed spectrum easily causes interference between a licensed spectrum and the unlicensed spectrum in the prior art is avoided.

BRIEF DESCRIPTION OF THE DRAWINGS

To describe the technical solutions in the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be noted that, in the embodiments of the present invention, a base station has a capability of performing communication with a terminal by using a licensed (Licensed) spectrum and an unlicensed (Unlicensed) spectrum.

Embodiment 1

Figure 1:
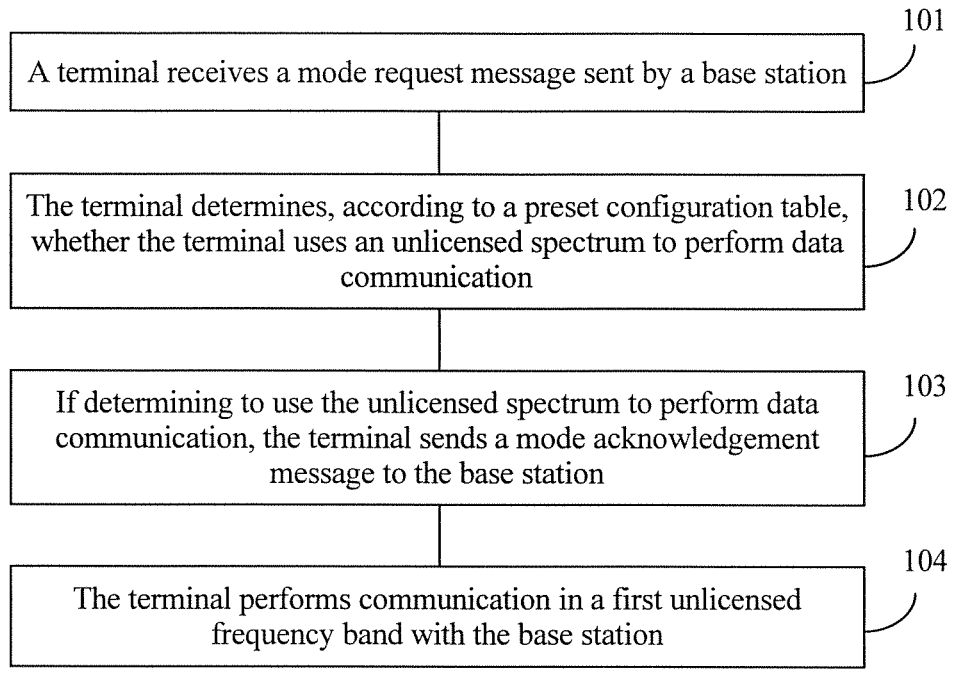
FIG. 1 is a flowchart of a method for performing data communication by using an unlicensed spectrum according to an embodiment of the present invention.

FIG. 1 is a flowchart of a method for performing data communication by using an unlicensed spectrum according to the embodiment of the present invention. As shown in FIG. 1, the method may include the following steps:

101. A terminal receives a mode request message sent by a base station.

The mode request message is used to request the terminal to use an unlicensed spectrum to perform data communication.

102. The terminal determines, according to a preset configuration table, whether the terminal uses an unlicensed spectrum to perform data communication.

The preset configuration table includes a first option, a second option, and a third option, where the first option includes an enabling status of an unlicensed spectrum mode, the second option includes a preset priority order of the unlicensed spectrum mode and a first communication mode, and the third option includes a preset priority order of, corresponding to a data service type, the unlicensed spectrum mode and the first communication mode, where the first communication mode includes a licensed spectrum mode and a WiFi mode, or a licensed spectrum mode, or a WiFi mode.

Preferably, the first option is a service enabling option, and may include the enabling status of the unlicensed spectrum mode (Cellular-U), an enabling status of the licensed spectrum mode (Cellular), and an enabling status of the WiFi mode. The terminal may determine an enabling status of a mode according to an input command of a user. Preferably, user may click a preset configuration button corresponding to a mode in a user interface of the terminal to determine an enabling status of the mode. For example, the user interface of the terminal displays an ON button and an OFF button corresponding to the unlicensed spectrum mode, and the user may click the ON button to set the unlicensed spectrum mode to an enabled state.

The second option may include the preset priority order of the unlicensed spectrum mode, the licensed spectrum mode, and the WiFi mode. Preferably, the preset priority order in the second option may be any one of the following four configurations:

(1) default configuration: WiFi>Cellular-U>Cellular;
(2) advanced configuration: Cellular-U>WiFi>Cellular;
(3) intermediate configuration: WiFi>Cellular-U>Cellular; or
(4) low configuration: WiFi>Cellular>Cellular-U.

It should be noted that, the modes in each configuration are sorted according to a descending order of priorities, where the priority order in each configuration is set according to a terminal requirement and is not limited herein in the embodiment of the present invention.

The third option may include the preset priority order of the unlicensed spectrum mode, the licensed spectrum mode, and the WiFi mode, corresponding to the data service type. For example, a priority order (descending order) of the modes, corresponding to a video service, is WiFi, Cellular-U, and Cellular; a priority order (descending order) corresponding to a web browse service is Cellular-U, WiFi, and Cellular.

Preferably, the terminal may query the first option in the preset configuration table;

if the unlicensed spectrum mode in the first option is in the enabled state, the terminal may view the second option or the third option in the preset configuration table; and if the unlicensed spectrum mode in all modes that are in enabled states in the second option has a highest priority, or if the unlicensed spectrum mode in all modes that are in enabled states in the priority order corresponding to the data service type in the third option has a highest priority, the terminal may determine that the terminal uses the unlicensed spectrum to perform data communication.

The following uses an example to describe a specific process in which the terminal determines, according to a preset configuration table (Table 1), whether the terminal uses the unlicensed spectrum to perform data communication, where priorities in the second option and the third option in Table 1 are sorted according to the descending order.

TABLE 1

| First option | Cellular-U | Cellular | WiFi |
|---|---|---|---|
| | ON ⊙ OFF ○ | ON ⊙ OFF ○ | ON ⊙ OFF ○ |
| Second option | WiFi > Cellular-U > Cellular | | |
| Third option | Social networking service | Cellular-U, Cellular, and WiFi | |
| | Telephone and short message services | Cellular, Cellular-U, and WiFi | |
| | Video service | WiFi, Cellular-U, and Cellular | |
| | Web browse | Cellular-U, WiFi, and Cellular | |

The terminal queries the first option in Table 1, and learns that Cellular-U (unlicensed mode) and Cellular (licensed mode) are in the enabled states; and the terminal views the second option in Table 1, and learns that in Cellular-U and Cellular that are in the enabled states, a priority of Cellular-U is higher than that of Cellular, that is, Cellular-U has a higher priority, and therefore, determines that the terminal uses the unlicensed spectrum to perform data communication; or assuming that the terminal browses web pages when performing a data transmission service with the base station, the terminal views the third option in Table 1, and learns that in Cellular-U and Cellular that are in the enabled states in the priority order corresponding to web browse, a priority of Cellular-U is higher than that of Cellular, that is, Cellular-U has a highest priority, and therefore, determines that the terminal uses the unlicensed spectrum to perform data communication.

Further, if the unlicensed spectrum mode in the first option in the preset configuration table is in a disabled state; or if the unlicensed spectrum mode in the first option in the preset configuration table is in the enabled state, and the unlicensed spectrum mode in all modes that are in the enabled states in the second option does not have a highest priority, or the unlicensed spectrum mode in all modes that are in the enabled states in the priority order corresponding to the data service type in the third option does not have a highest priority, the terminal determines that the terminal cannot use the unlicensed spectrum to perform data communication.

103. If determining to use the unlicensed spectrum to perform data communication, the terminal sends a mode acknowledgement message to the base station.

The mode acknowledgement message is used to indicate that the terminal determines to use the unlicensed spectrum to perform data communication.

104. The terminal performs communication in a first unlicensed frequency band with the base station.

The first unlicensed frequency band is any unlicensed frequency band in an intersection of all unlicensed frequency bands supported by the terminal and all unlicensed frequency bands supported by the base station. For example, if all the unlicensed frequency bands supported by the base station are 2.4 G, 5.8 G, and 60 G, and the unlicensed frequency bands supported by the terminal are 2.4 G, 5.8 G, and 40 G, the terminal or a mobility management entity selects a frequency band from 2.4 G and 5.8 G as the first unlicensed frequency band. It should be noted that, in the embodiment of the present invention, the intersection of all the unlicensed frequency bands supported by the terminal and all the unlicensed frequency bands supported by the base station includes at least one unlicensed frequency band.

Preferably, the first unlicensed frequency band may be determined by the terminal (User Equipment, UE) or the mobility management entity (Mobility Management Entity, MME). The two cases are hereinafter further described separately.

(1) The First Unlicensed Frequency Band is Determined by the Terminal

Further, the mode acknowledgement message in step 103 includes the first unlicensed frequency band, and the mode request message in step 101 includes all the unlicensed frequency bands supported by the base station.

Correspondingly, between step 103 and step 104, the method further includes:
the terminal selects the first unlicensed frequency band from the intersection of all the unlicensed frequency bands supported by the terminal and all the unlicensed frequency bands supported by the base station.

In addition, before step 101, the method further includes:
the terminal receives a system broadcast message sent by the base station, where the system broadcast message is used to indicate that the base station supports the unlicensed spectrum for performing data communication; and the terminal sends a report message to the base station, so that the base station sends the mode request message to the terminal after the base station determines that the base station uses the unlicensed spectrum to perform data communication, where the report message is used to indicate that the terminal supports the unlicensed spectrum for performing data communication.

Preferably, the terminal may send the report message to the base station by using a random access channel (Random Access Channel, RACH).

(2) The First Unlicensed Frequency Band is Determined by the Mobility Management Entity Further, the mode request message in step 101 includes the first unlicensed frequency band.

Correspondingly, before step 101, the method may further include:
the terminal sends capability information of the terminal to the base station, so that the base station sends the capability information of the terminal and capability information of the base station to the mobility management entity, and further that the mobility management entity stores the capability information of the terminal and the capability information of the base station and determines the first unlicensed frequency band according to the capability information of the terminal and the capability information of the base station, where the capability information of the terminal includes all the unlicensed frequency bands supported by the terminal, and the capability information of the base station includes all the unlicensed frequency bands supported by the base station.

Further, after the terminal sends the capability information of the terminal to the base station, and before the mode request message sent by the base station is received, the method may further include:
the terminal sends a service request message to the base station, so that the base station sends the service request message to the mobility management entity, and further that the mobility management entity sends the mode request message to the base station.

The service request message may include information about pre-using the unlicensed spectrum to perform data communication by the terminal.

Correspondingly, the terminal determines, according to a type of service requested by the terminal and the third option in the preset configuration table, that the terminal pre-uses the unlicensed spectrum to perform data communication. For example, if the type of service requested by the terminal is a social networking service (such as WeChat, microblog, or QQ), and it can be learned, according to the third option in Table 1, that the unlicensed spectrum mode (Cellular-U) in a priority order corresponding to the social networking service has a highest priority, the terminal determines that the terminal pre-uses the unlicensed spectrum to perform data communication.

As can be learned from above, in the method for performing data communication by using an unlicensed spectrum according to the embodiment of the present invention, a terminal receives a mode request message sent by a base station, and determines, according to a preset configuration table, whether the terminal uses an unlicensed spectrum to perform data communication; and if determining to use the unlicensed spectrum to perform data communication, the terminal sends a mode acknowledgement message to the base station, and performs data communication in a first unlicensed frequency band with the base station, where the first unlicensed frequency band is any unlicensed frequency band in an intersection of all unlicensed frequency bands supported by the terminal and all unlicensed frequency bands supported by the base station, and is determined by the terminal or a mobility management entity. Therefore, through negotiation between the base station and the terminal or among the mobility management entity, the base station, and the terminal, an unlicensed spectrum resource is properly scheduled for data communication in a cellular system, and a problem that random access to the unlicensed spectrum easily causes interference between a licensed spectrum and the unlicensed spectrum in the prior art is avoided.

Embodiment 2

Figure 2:
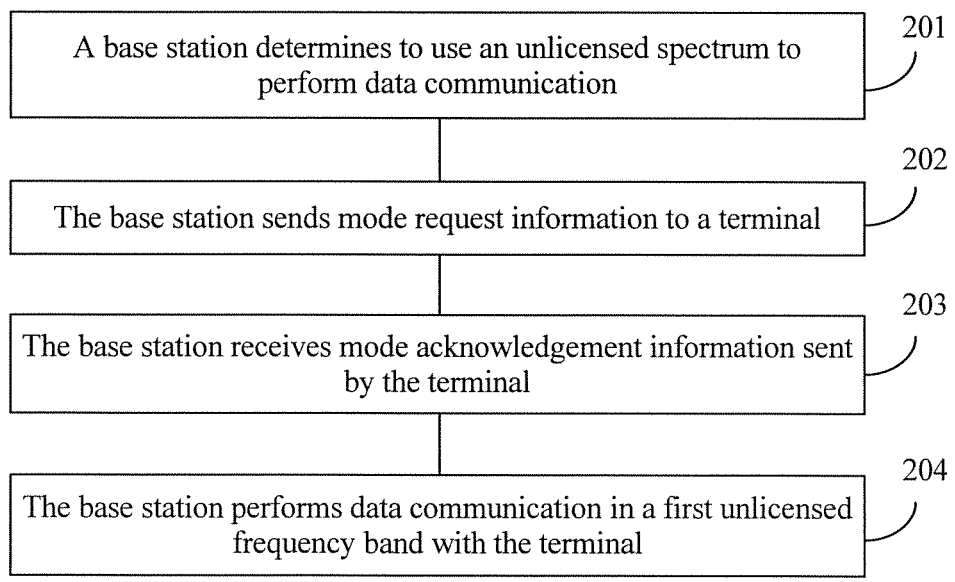
FIG. 2 is a flowchart of a method for performing data communication by using an unlicensed spectrum according to an embodiment of the present invention.

FIG. 2 is a flowchart of a method for performing data communication by using an unlicensed spectrum according to the embodiment of the present invention. As shown in FIG. 2, the method may include the following steps:

201. A base station determines to use an unlicensed spectrum to perform data communication.

Exemplarily, that a base station determines to use an unlicensed spectrum to perform data communication specifically includes:

the base station detects an unused licensed spectrum resource; and if the unused licensed spectrum resource is smaller than a spectrum resource required for performing data communication with a terminal, the base station determines to use the unlicensed spectrum to perform data communication.

The spectrum resource required for performing data communication between the base station and the terminal may be determined in the following manners:

(1) when the terminal needs to transmit uplink data, the base station determines, according to an amount of data that the terminal needs to transmit, which is periodically reported by the terminal, the spectrum resource required for performing data communication with the terminal; and (2) when the base station needs to transmit downlink data to the terminal, the base station determines, by periodically detecting a data buffer size corresponding to the terminal, the resource required for performing data communication with the terminal.

202. The base station sends mode request information to a terminal, so that the terminal determines, according to a preset configuration table, that the terminal uses the unlicensed spectrum to perform data communication.

The mode request information is used to request the terminal to use the unlicensed spectrum to perform data communication.

203. The base station receives mode acknowledgement information sent by the terminal, where the mode acknowledgement message is used to indicate that the terminal determines to use the unlicensed spectrum to perform data communication.

204. The base station performs data communication in a first unlicensed frequency band with the terminal.

The first unlicensed frequency band is any unlicensed frequency band in an intersection of all unlicensed frequency bands supported by the terminal and all unlicensed frequency bands supported by the base station.

Preferably, the first unlicensed frequency band may be determined by the terminal (User Equipment, UE) or a mobility management entity (Mobility Management Entity, MME). The two cases are hereinafter further described separately.

(1) The First Unlicensed Frequency Band is Determined by the Terminal

Further, the mode acknowledgement message in step 203 includes the first unlicensed frequency band.

Correspondingly, before step 201, the method further includes:

the base station sends a system broadcast message to the terminal, where the system broadcast message is used to indicate that the base station supports the unlicensed spectrum for performing data communication; and the base station receives a report message sent by the terminal, where the report message is used to indicate that the terminal supports the unlicensed spectrum for performing data communication.

Preferably, the base station may send the system broadcast message to the terminal by using a system message block in a broadcast channel.

(2) The First Unlicensed Frequency Band is Determined by the Mobility Management Entity Further, the mode request message in step 202 includes the first unlicensed frequency band.

Correspondingly, between step 203 and step 204, the method further includes:

the base station sends the mode acknowledgement message to the mobility management entity, so that the mobility management entity establishes a data transmission link, and further that the base station performs data communication in the first unlicensed frequency band with the terminal, where the mode acknowledgement message is used to indicate that the base station and the terminal determine to use the unlicensed spectrum to perform data communication.

Further, before step 201, the method further includes:

the base station receives capability information of the terminal that is sent by the terminal, and sends the capability information of the terminal and capability information of the base station to the mobility management entity, so that the mobility management entity determines the first unlicensed frequency band according to the capability information of the terminal and the capability information of the base station and sends the mode request message to the base station, where the capability information of the terminal includes all the unlicensed frequency bands supported by the terminal, and the capability information of the base station includes all the unlicensed frequency bands supported by the base station; and the base station receives the mode request message sent by the mobility management entity.

Further, after the base station sends the capability information of the terminal and the capability information of the base station to the mobility management entity, and before the mode request message sent by the mobility management entity is received, the method further includes:

the base station receives a service request message sent by the terminal, and sends the service request message to the mobility management entity, so that the mobility management entity sends the mode request message to the base station.

The service request message may include information about pre-using the unlicensed spectrum to perform data communication by the terminal. The terminal determines, according to a type of service requested by the terminal and a third option in the preset configuration table, that the terminal pre-uses the unlicensed spectrum to perform data communication.

As can be learned from above, in the method for performing data communication by using an unlicensed spectrum according to the embodiment of the present invention, a base station determines to use an unlicensed spectrum to perform data communication, and sends mode request information to a terminal, so that the terminal determines, according to a preset configuration table, that the terminal uses the unlicensed spectrum to perform data communication; and the base station receives mode acknowledgement information sent by the terminal, and performs data communication in a first unlicensed frequency band with the terminal, where the first unlicensed frequency band is any unlicensed frequency band in an intersection of all unlicensed frequency bands supported by the terminal and all unlicensed frequency bands supported by the base station, and is determined by the terminal or a mobility management entity. Therefore, through negotiation between the base station and the terminal or among the mobility management entity, the base station, and the terminal, an unlicensed spectrum resource is properly scheduled for data communication in a cellular system, and a problem that random access to the unlicensed spectrum easily causes interference between a licensed spectrum and the unlicensed spectrum in the prior art is avoided.

Embodiment 3

Figure 3:
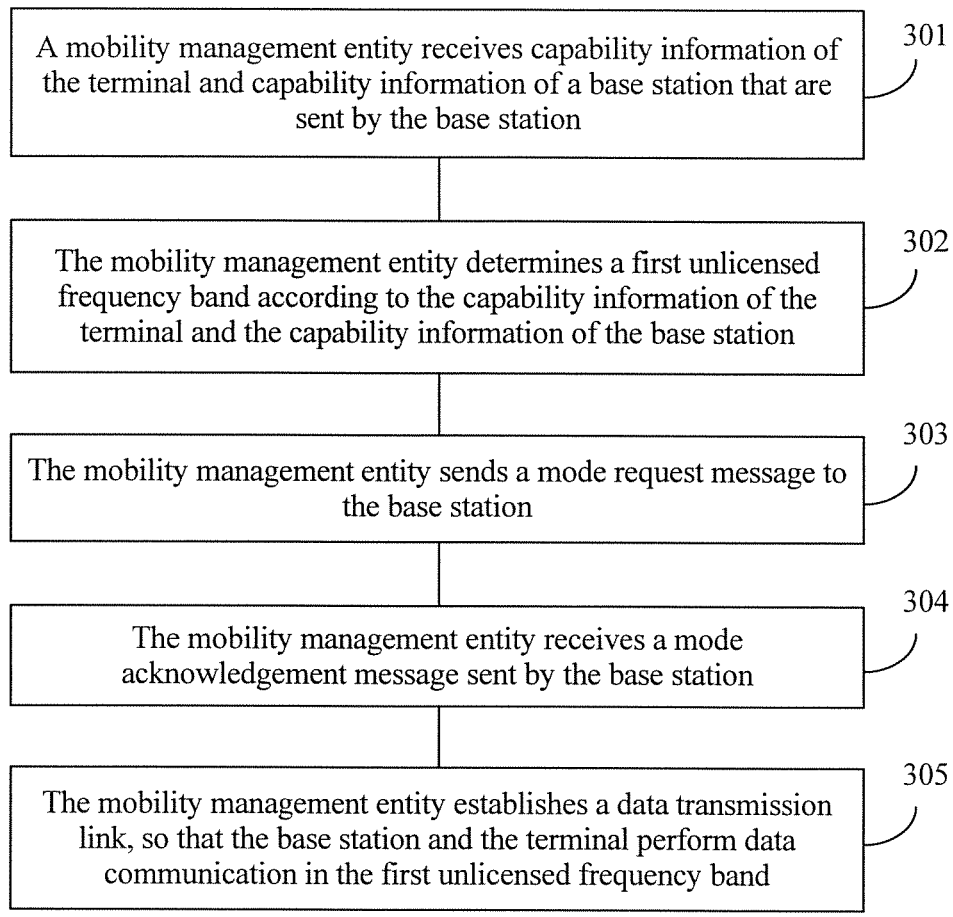
FIG. 3 is a flowchart of a method for performing data communication by using an unlicensed spectrum according to an embodiment of the present invention.

FIG. 3 is a flowchart of a method for performing data communication by using an unlicensed spectrum according to the embodiment of the present invention. As shown in FIG. 3, the method may include the following steps:

301. A mobility management entity receives capability information of the terminal and capability information of a base station that are sent by the base station.

The capability information of the terminal includes all unlicensed frequency bands supported by the terminal, and the capability information of the base station includes all unlicensed frequency bands supported by the base station.

302. The mobility management entity determines a first unlicensed frequency band according to the capability information of the terminal and the capability information of the base station.

Preferably, the mobility management entity may determine the first unlicensed frequency band in the following manners, but is not limited thereto:

(1) selecting any unlicensed frequency band from an intersection of all the unlicensed frequency bands supported by the terminal and all the unlicensed frequency bands supported by the base station, as the first unlicensed frequency band; and (2) viewing usage of the unlicensed frequency bands supported by the base station, and selecting a relatively idle unlicensed frequency band as the first unlicensed frequency band.

303. The mobility management entity sends a mode request message to the base station, so that the base station determines to use an unlicensed spectrum to perform data communication and sends the mode request message to the terminal, and further that the terminal determines, according to a preset configuration table, to use the unlicensed spectrum to perform data communication.

The mode request message includes the first unlicensed frequency band.

304. The mobility management entity receives a mode acknowledgement message sent by the base station, where the mode acknowledgement message is used to indicate that the base station and the terminal determine to use the unlicensed spectrum to perform data communication.

305. The mobility management entity establishes a data transmission link, so that the base station and the terminal perform data communication in the first unlicensed frequency band.

Further, between step 302 and step 303, the method may further include: the mobility management entity receives a service request message sent by the base station, where the service request message is sent by the terminal.

The service request message may include information about pre-using the unlicensed spectrum to perform data communication by the terminal. The terminal determines, according to a type of service requested by the terminal and a third option in the preset configuration table, that the terminal pre-uses the unlicensed spectrum to perform data communication.

As can be learned from above, in the method for performing data communication by using an unlicensed spectrum according to the embodiment of the present invention, a mobility management entity receives capability information of the terminal and capability information of a base station that are sent by the base station, and stores the capability information of the terminal and the capability information of the base station; the mobility management entity receives a service request message sent by the base station; the mobility management entity determines a first unlicensed frequency band according to the capability information of the terminal and the capability information of the base station; the mobility management entity sends a mode request message to the base station, so that the base station stores the first unlicensed frequency band and sends the mode request message to the terminal after the base station determines to use an unlicensed spectrum to perform data communication, and further that the terminal determines, according to a preset configuration table, to use the unlicensed spectrum to perform data communication; the mobility management entity receives a mode acknowledgement message sent by the base station; and the mobility management entity establishes a data transmission link, so that the base station and the terminal perform data communication in the first unlicensed frequency band. Therefore, through negotiation among the mobility management entity, the base station, and the terminal, an unlicensed spectrum resource is properly scheduled for data communication in a cellular system, and a problem that random access to the unlicensed spectrum easily causes interference between a licensed spectrum and the unlicensed spectrum in the prior art is avoided.

The methods provided by the embodiments of the present invention are hereinafter described in detail.

Embodiment 4

Figure 4:
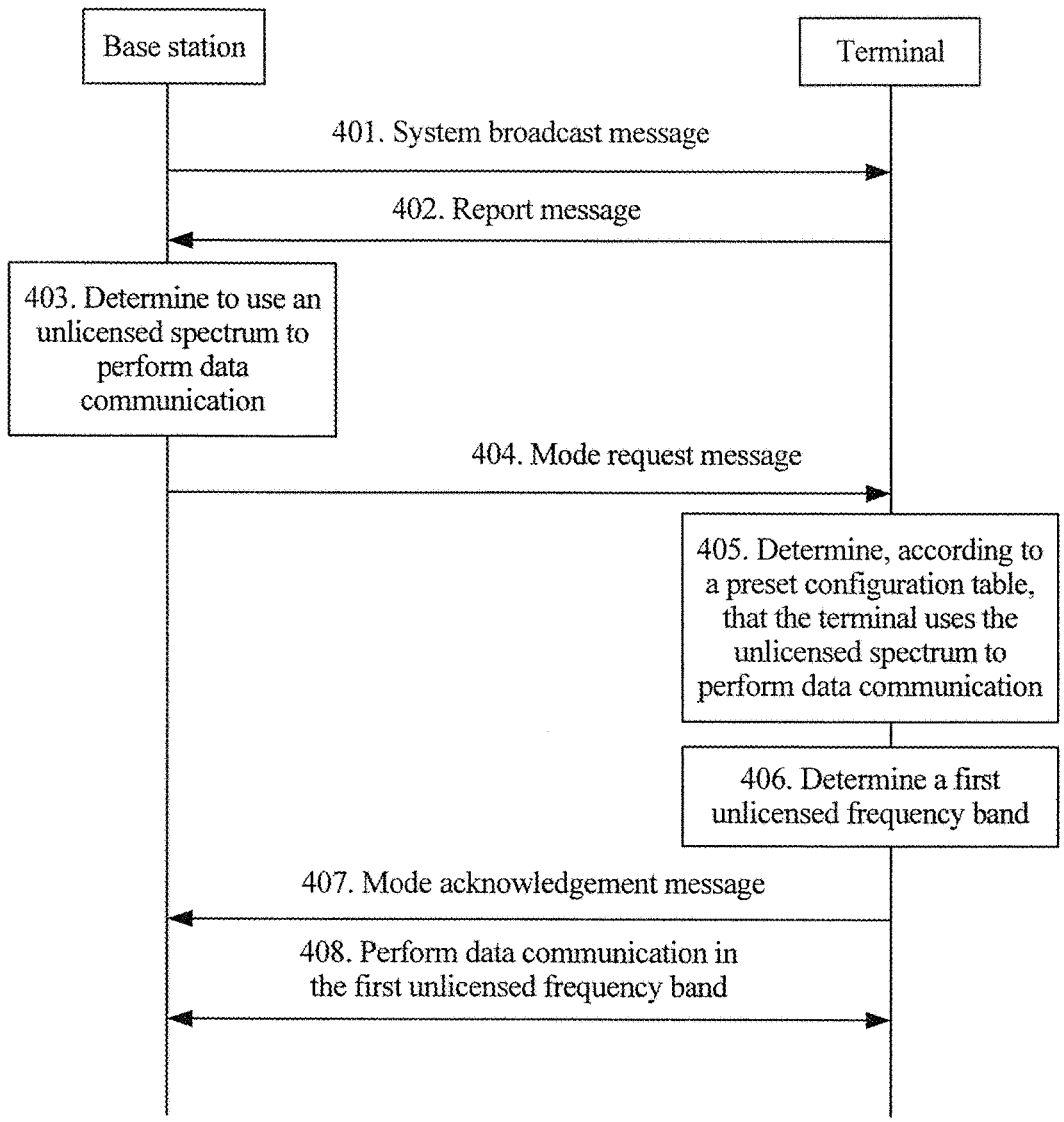
FIG. 4 is a flowchart of a method for performing data communication by using an unlicensed spectrum according to an embodiment of the present invention.

FIG. 4 is a flowchart of a method for performing data communication by using an unlicensed spectrum according to the embodiment of the present invention. As shown in FIG. 4, the method may include:

401. A base station sends a system broadcast message to a terminal, where the system broadcast message is used to indicate that the base station supports an unlicensed spectrum for performing data communication.

Preferably, the base station may send the system broadcast message by using a system message block (System Information Block, SIB) in a physical broadcast channel (Physical Broadcast Channel, PBCH), that is, a Cellular-U mode field is added to the system message block.

402. The terminal sends a report message to the base station, where the report message is used to indicate that the terminal supports the unlicensed spectrum for performing data communication.

Preferably, the terminal may send the report message to the base station by using a random access channel (Random Access Channel, RACH).

403. The base station determines to use the unlicensed spectrum to perform data communication.

404. The base station sends mode request information to the terminal, where the mode request message includes all unlicensed frequency bands supported by the base station and is used to request the terminal to use the unlicensed spectrum to perform data communication.

405. The terminal receives the mode request message sent by the base station, and determines, according to a preset configuration table, that the terminal uses the unlicensed spectrum to perform data communication.

406. The terminal determines a first unlicensed frequency band.

407. The terminal sends a mode acknowledgement message to the base station, where the mode acknowledgement message includes the first unlicensed frequency band.

408. The base station performs data communication in the first unlicensed frequency band with the terminal.

As can be learned from above, in the method for performing data communication by using an unlicensed spectrum according to the embodiment of the present invention, a base station sends a system broadcast message to a terminal, where the system broadcast message is used to indicate that the base station supports an unlicensed spectrum for performing data communication; the terminal sends a report message to the base station, where the report message is used to indicate that the terminal supports the unlicensed spectrum for performing data communication; the base station determines to use the unlicensed spectrum to perform data communication, and sends mode request information to the terminal; the terminal receives the mode request message sent by the base station, determines, according to a preset configuration table, that the terminal uses the unlicensed spectrum to perform data communication, determines a first unlicensed frequency band, and sends a mode acknowledgement message to the base station, where the mode acknowledgement message includes the first unlicensed frequency band; and the base station performs data communication in the first unlicensed frequency band with the terminal. Therefore, through negotiation between the base station and the terminal, an unlicensed spectrum resource is properly scheduled for data communication in a cellular system, and a problem that random access to the unlicensed spectrum easily causes interference between a licensed spectrum and the unlicensed spectrum in the prior art is avoided.

Embodiment 5

Figure 5:
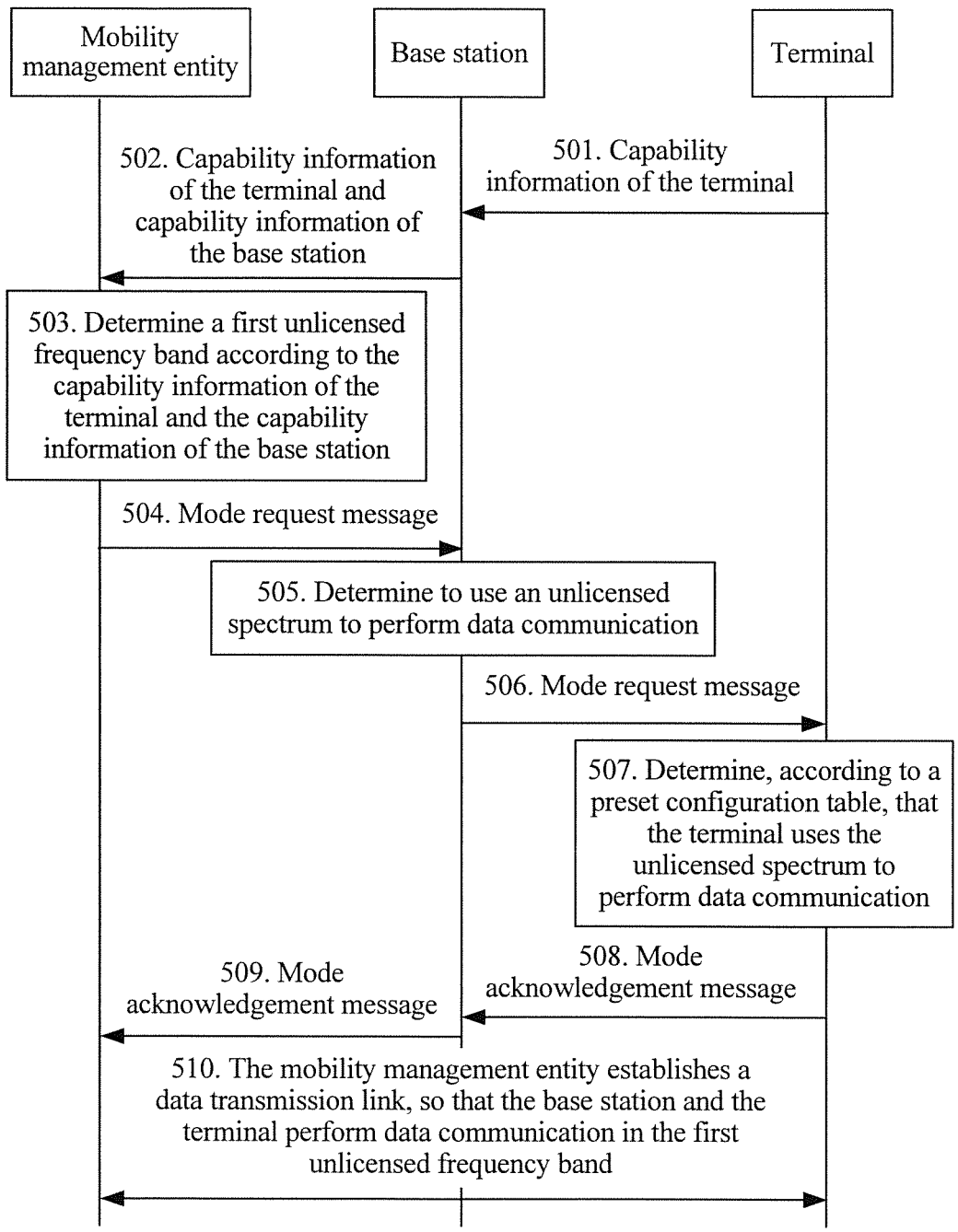
FIG. 5 is a flowchart of a method for performing data communication by using an unlicensed spectrum according to an embodiment of the present invention.

FIG. 5 is a flowchart of a method for performing data communication by using an unlicensed spectrum according to the embodiment of the present invention. As shown in FIG. 5, the method may include:

501. A terminal sends capability information of the terminal to a base station, where the capability information of the terminal includes all unlicensed frequency bands supported by the terminal.

502. The base station sends the capability information of the terminal and capability information of the base station to a mobility management entity, where the capability information of the base station includes all unlicensed frequency bands supported by the base station.

503. The mobility management entity determines a first unlicensed frequency band according to the capability information of the terminal and the capability information of the base station.

504. The mobility management entity sends a mode request message to the base station, where the mode request message includes the first unlicensed frequency band.

505. The base station determines to use an unlicensed spectrum to perform data communication.

506. The base station sends the mode request message to the terminal.

507. The terminal determines, according to a preset configuration table, that the terminal uses the unlicensed spectrum to perform data communication.

508. The terminal sends a mode acknowledgement message to the base station.

509. The base station sends the mode acknowledgement message to the mobility management entity.

510. The mobility management entity establishes a data transmission link, so that the base station and the terminal perform data communication in the first unlicensed frequency band.

Further, between step 503 and step 504, the method may further include:

the terminal sends a service request message to the base station; and the base station sends the service request message to the mobility management entity.

The service request message may include information about pre-using the unlicensed spectrum to perform data communication by the terminal. The terminal determines, according to a type of service requested by the terminal and a third option in the preset configuration table, that the terminal pre-uses the unlicensed spectrum to perform data communication.

As can be learned from above, in the method for performing data communication by using an unlicensed spectrum according to the embodiment of the present invention, a terminal sends capability information of the terminal to a base station; the base station sends the capability information of the terminal and capability information of the base station to a mobility management entity; the mobility management entity stores the capability information of the terminal and the capability information of the base station; the mobility management entity determines a first unlicensed frequency band according to the capability information of the terminal and the capability information of the base station, and sends a mode request message to the base station; the base station determines to use an unlicensed spectrum to perform data communication, and sends the mode request message to the terminal; the terminal determines, according to a preset configuration table, to use the unlicensed spectrum to perform data communication, and sends a mode acknowledgement message to the base station; the base station sends the mode acknowledgement message to the mobility management entity; and the mobility management entity establishes a data transmission link, so that the base station and the terminal perform data communication in the first unlicensed frequency band. Therefore, through negotiation among the mobility management entity, the base station, and the terminal, an unlicensed spectrum resource is properly scheduled for data communication in a cellular system, and a problem that random access to the unlicensed spectrum easily causes interference between a licensed spectrum and the unlicensed spectrum in the prior art is avoided.

Embodiment 6

Figure 6:
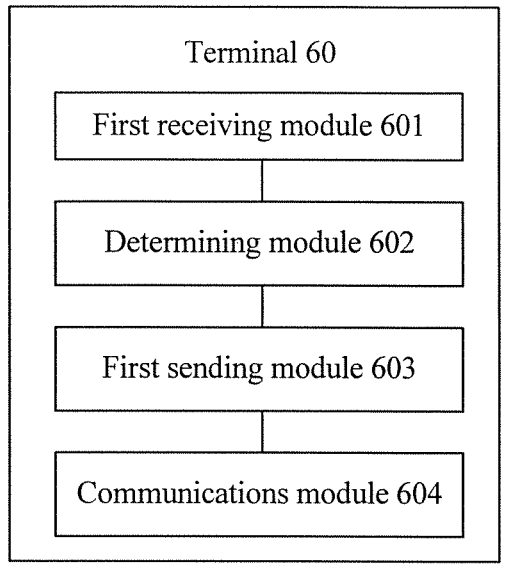
FIG. 6 is a structural diagram of a terminal according to an embodiment of the present invention.

FIG. 6 is a structural diagram of a terminal according to the embodiment of the present invention. As shown in FIG. 6, the terminal 60 includes a first receiving module 601, a determining module 602, a first sending module 603, and a communications module 604.

The first receiving module 601 is configured to receive a mode request message sent by a base station.

The mode request message is used to request the terminal to use an unlicensed spectrum to perform data communication.

The determining module 602 is configured to determine, according to a preset configuration table, whether the terminal uses the unlicensed spectrum to perform data communication.

The first sending module 603 is configured to send, if the terminal determines to use the unlicensed spectrum to perform data communication, a mode acknowledgement message to the base station.

The mode acknowledgement message is used to indicate that the terminal determines to use the unlicensed spectrum to perform data communication.

The communications module 604 is configured to perform data communication in a first unlicensed frequency band with the base station, where the first unlicensed frequency band is any unlicensed frequency band in an intersection of all unlicensed frequency bands supported by the terminal and all unlicensed frequency bands supported by the base station.

The first unlicensed frequency band is any unlicensed frequency band in the intersection of all the unlicensed frequency bands supported by the terminal and all the unlicensed frequency bands supported by the base station. For example, if all the unlicensed frequency bands supported by the base station are 2.4 G, 5.8 G, and 60 G, and the unlicensed frequency bands supported by the terminal are 2.4 G, 5.8 G, and 40 G the terminal or a mobility management entity selects a frequency band from 2.4 G and 5.8 G as the first unlicensed frequency band. It should be noted that, in the embodiment of the present invention, the intersection of all the unlicensed frequency bands supported by the terminal and all the unlicensed frequency bands supported by the base station includes at least one unlicensed frequency band.

Further, the preset configuration table includes a first option, a second option, and a third option, where the first option includes an enabling status of an unlicensed spectrum mode, the second option includes a preset priority order of the unlicensed spectrum mode and a first communication mode, and the third option includes a preset priority order of, corresponding to a data service type, the unlicensed spectrum mode and the first communication mode, where the first communication mode includes a licensed spectrum mode and a WiFi mode, or a licensed spectrum mode, or a WiFi mode.

Correspondingly, the determining module 602 is specifically configured to:

query the first option in the preset configuration table;

if the unlicensed spectrum mode in the first option is in an enabled state, view the second option or the third option in the preset configuration table; and if the unlicensed spectrum mode in all modes that are in enabled states in the second option has a highest priority, or if the unlicensed spectrum mode in all modes that are in enabled states in the priority order corresponding to the data service type in the third option has a highest priority, determine that the terminal uses the unlicensed spectrum to perform data communication.

Preferably, the first option is a service enabling option, and may include the enabling status of the unlicensed spectrum mode (Cellular-U), an enabling status of the licensed spectrum mode (Cellular), and an enabling status of the WiFi mode. The terminal may determine an enabling status of a mode according to an input command of a user. Preferably, user equipment may click a preset configuration button corresponding to a mode on a user interface of the terminal to determine an enabling status of the mode. For example, the interface of the terminal displays an ON button and an OFF button of the unlicensed mode, and the user equipment may click the ON button to set the unlicensed mode to the enabled state.

The second option may include the preset priority order of the unlicensed spectrum mode, the licensed spectrum mode, and the WiFi mode. Preferably, the preset priority order in the second option may be any one of the following four configurations:

(1) default configuration: WiFi>Cellular-U>Cellular;
(2) advanced configuration: Cellular-U>WiFi>Cellular;
(3) intermediate configuration: WiFi>Cellular-U>Cellular; or
(4) low configuration: WiFi>Cellular>Cellular-U.

It should be noted that, the modes in each configuration are sorted according to a descending order of priorities, where the priority order in each configuration is set according to a terminal requirement and is not limited herein in the embodiment of the present invention.

The third option may include the preset priority order of the unlicensed spectrum mode, the licensed spectrum mode, and the WiFi mode, corresponding to the data service type. For example, a priority order (descending order) of the modes, corresponding to a video service, is WiFi, Cellular-U, and Cellular; a priority order (descending order) corresponding to a web browse service is Cellular-U, WiFi, and Cellular.

The following uses an example to describe a specific process in which the determining module 602 determines, according to a preset configuration table (Table 1), whether the terminal uses the unlicensed spectrum to perform data communication, where priorities in the second option and the third option in Table 1 are sorted according to the descending order.

The determining module 602 queries the first option in Table 1, and learns that Cellular-U (unlicensed mode) and Cellular (licensed mode) are in the enabled states; and the determining module views the second option in Table 1, and learns that in Cellular-U and Cellular that are in the enabled states, a priority of Cellular-U is higher than that of Cellular, that is, Cellular-U has a higher priority, and therefore, determines that the terminal uses the unlicensed spectrum to perform data communication; or assuming that the terminal browses web pages when performing a data transmission service with the base station, the determining module views the third option in Table 1, and learns that in Cellular-U and Cellular that are in the enabled states in the priority order corresponding to web browse, a priority of Cellular-U is higher than that of Cellular, that is, Cellular-U has a highest priority, and therefore, determines that the terminal uses the unlicensed spectrum to perform data communication.

Further, the determining module 602 is further configured to:

if the unlicensed spectrum mode in the first option in the preset configuration table is in a disabled state; or if the unlicensed spectrum mode in the first option in the preset configuration table is in the enabled state, and the unlicensed spectrum mode in all modes that are in the enabled states in the second option does not have a highest priority, or the unlicensed spectrum mode in all modes that are in the enabled states in the priority order corresponding to the data service type in the third option does not have a highest priority, determine that the terminal cannot use the unlicensed spectrum to perform data communication.

In the embodiment of the present invention, the first unlicensed frequency band may be determined by the terminal (User Equipment, UE) or the mobility management entity (Mobility Management Entity, MME). The two cases are hereinafter described separately.

(1) The First Unlicensed Frequency Band is Determined by the Terminal

Further, the mode acknowledgement message includes the first unlicensed frequency band, and the mode request message includes all the unlicensed frequency bands supported by the base station.

Figure 6A:
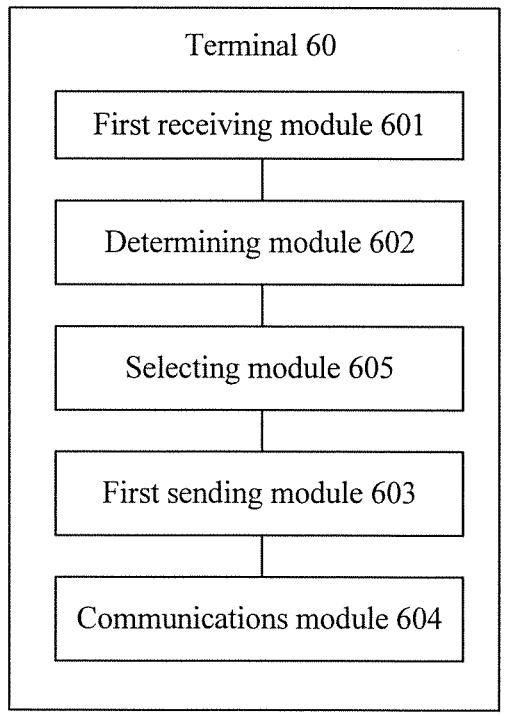
FIG. 6A is a structural diagram of a terminal according to an embodiment of the present invention.

Correspondingly, as shown in FIG. 6A, the terminal 60 further includes:

a selecting module 605, configured to select, after the determining module 602 determines to use the unlicensed spectrum to perform data communication, and before the first sending module 603 sends the mode acknowledgement information to the base station, the first unlicensed frequency band from the intersection of all the unlicensed frequency bands supported by the terminal and all the unlicensed frequency bands supported by the base station.

Figure 6B:
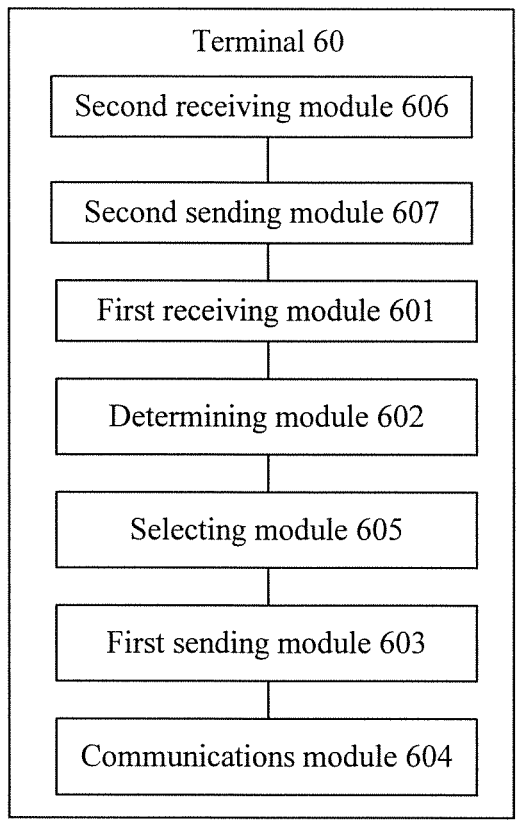
FIG. 6B is a structural diagram of a terminal according to an embodiment of the present invention.

Further, as shown in FIG. 6B, the terminal 60 further includes:

a second receiving module 606, configured to receive, before the first receiving module 601 receives the mode request message sent by the base station, a system broadcast message sent by the base station, where the system broadcast message is used to indicate that the base station supports the unlicensed spectrum for performing data communication; and a second sending module 607, configured to send a report message to the base station, so that the base station sends the mode request message to the terminal, where the report message is used to indicate that the terminal supports the unlicensed spectrum for performing data communication.

Preferably, the second sending module 607 may send the report message to the base station by using a random access channel (Random Access Channel, RACH).

(2) The First Unlicensed Frequency Band is Determined by the Mobility Management Entity Further, the mode request message includes the first unlicensed frequency band.

Figure 6C:
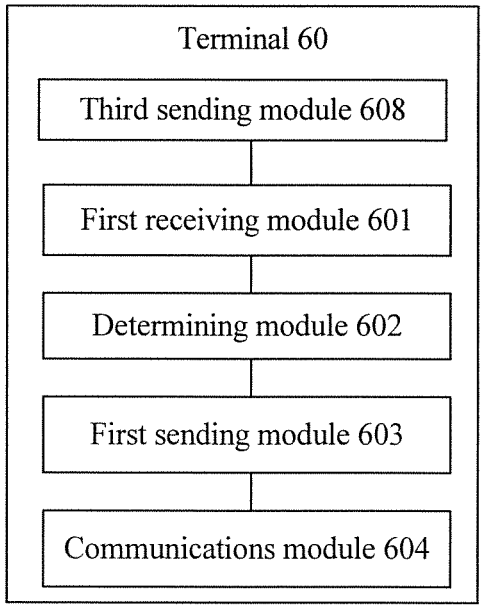
FIG. 6C is a structural diagram of a terminal according to an embodiment of the present invention.

Correspondingly, as shown in FIG. 6C, the terminal further includes:

a third sending module 608, configured to send, before the first receiving module 601 receives the mode request message sent by the base station, capability information of the terminal to the base station, so that the base station sends the capability information of the terminal and capability information of the base station to the mobility management entity, and further that the mobility management entity determines the first unlicensed frequency band according to the capability information of the terminal and the capability information of the base station, where the capability information of the terminal includes all the unlicensed frequency bands supported by the terminal, and the capability information of the base station includes all the unlicensed frequency bands supported by the base station.

Figure 6D:
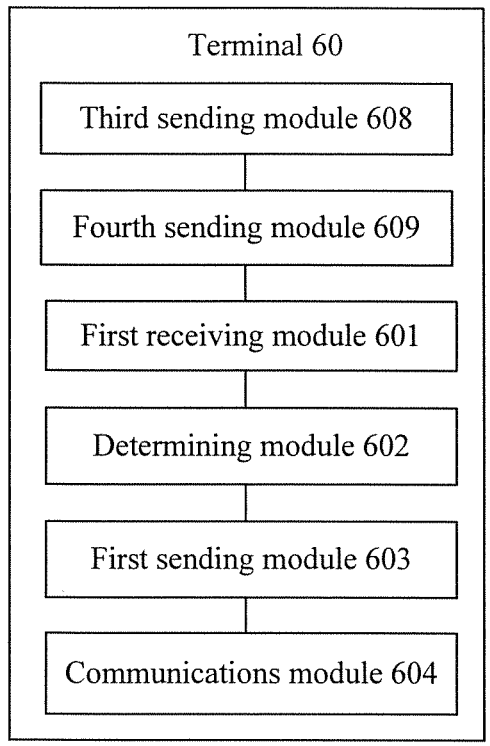
FIG. 6D is a structural diagram of a terminal according to an embodiment of the present invention.

Further, as shown in FIG. 6D, the terminal 60 further includes:

a fourth sending module 609, configured to send, after the third sending module 608 sends the capability information of the terminal, and before the first receiving module 601 receives the mode request message sent by the base station, a service request message to the base station, so that the base station sends the service request message to the mobility management entity, and further that the mobility management entity sends the mode request message to the base station.

As can be learned from above, a terminal 60 provided by the embodiment of the present invention receives a mode request message sent by a base station, and determines, according to a preset configuration table, whether the terminal uses an unlicensed spectrum to perform data communication; and if determining to use the unlicensed spectrum to perform data communication, the terminal sends a mode acknowledgement message to the base station, and performs data communication in a first unlicensed frequency band with the terminal, where the first unlicensed frequency band is any unlicensed frequency band in an intersection of all unlicensed frequency bands supported by the terminal and all unlicensed frequency bands supported by the base station, and is determined by the terminal or a mobility management entity. Therefore, through negotiation between the base station and the terminal or among the mobility management entity, the base station, and the terminal, an unlicensed spectrum resource is properly scheduled for data communication in a cellular system, and a problem that random access to the unlicensed spectrum easily causes interference between a licensed spectrum and the unlicensed spectrum in the prior art is avoided.

Embodiment 7

Figure 7:
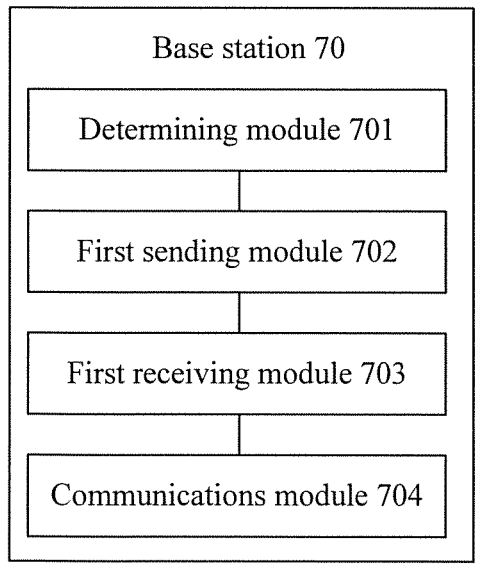
FIG. 7 is a structural diagram of a base station according to an embodiment of the present invention.

FIG. 7 is a structural diagram of a base station 70 according to the embodiment of the present invention. As shown in FIG. 7, the base station 70 includes a determining module 701, a first sending module 702, a first receiving module 703, and a communications module 704.

The determining module 701 is configured to determine to use an unlicensed spectrum to perform data communication.

The first sending module 702 is configured to send mode request information to a terminal.

The mode request information is used to request the terminal to use the unlicensed spectrum to perform data communication.

The first receiving module 703 is configured to receive mode acknowledgement information sent by the terminal.

The mode acknowledgement message is used to indicate that the terminal determines to use the unlicensed spectrum to perform data communication.

The communications module 704 is configured to perform data communication in a first unlicensed frequency band with the terminal.

The first unlicensed frequency band is any unlicensed frequency band in an intersection of all unlicensed frequency bands supported by the terminal and all unlicensed frequency bands supported by the base station.

Further, the determining module 701 is specifically configured to:

detect an unused licensed spectrum resource; and if the unused licensed spectrum resource is smaller than a spectrum resource required for performing data communication with the terminal, determine to use the unlicensed spectrum to perform data communication.

The spectrum resource required for performing data communication between the base station and the terminal may be determined by the determining module 701 in the following two manners:

(1) when the terminal needs to transmit uplink data, the determining module 701 determines, according to an amount of data that the terminal needs to transmit, which is periodically reported by the terminal, the spectrum resource required for performing data communication with the terminal; and (2) when the base station needs to transmit downlink data to the terminal, the determining module 701 determines, by periodically detecting a data buffer size corresponding to the terminal, the resource required for performing data communication with the terminal.

Preferably, the first unlicensed frequency band may be determined by the terminal (User Equipment, UE) or a mobility management entity (Mobility Management Entity, MME). The two cases are hereinafter further described separately.

(1) The First Unlicensed Frequency Band is Determined by the Terminal

Figure 7A:
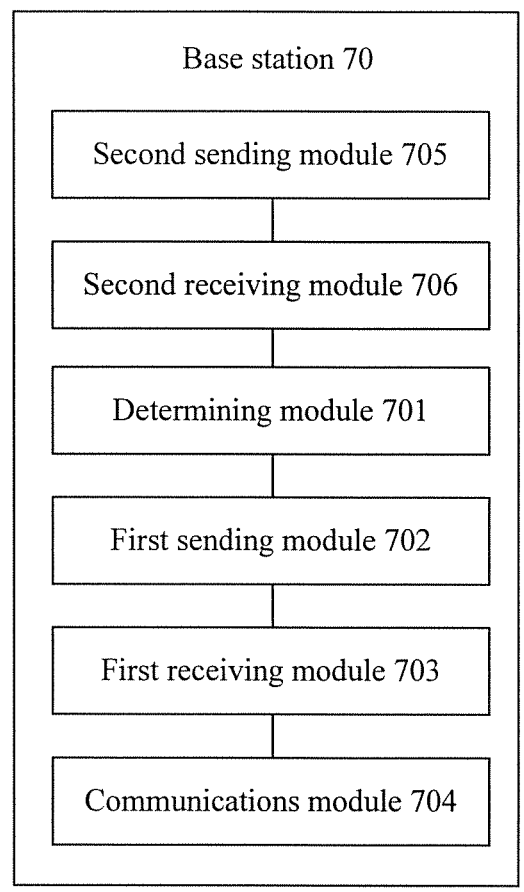
FIG. 7A is a structural diagram of a base station according to an embodiment of the present invention.

Correspondingly, the mode acknowledgement message includes the first unlicensed frequency band; and as shown in FIG. 7A, the base station 70 further includes:

a second sending module 705, configured to send, before the determining module determines to use the unlicensed spectrum to perform data communication, a system broadcast message to the terminal, where the system broadcast message is used to indicate that the base station supports the unlicensed spectrum for performing data communication; and a second receiving module 706, configured to receive a report message sent by the terminal, where the report message is used to indicate that the terminal supports the unlicensed spectrum for performing data communication.

Preferably, the second sending module 705 may send the system broadcast message to the terminal by using a system message block in a physical broadcast channel.

Figure 7B:
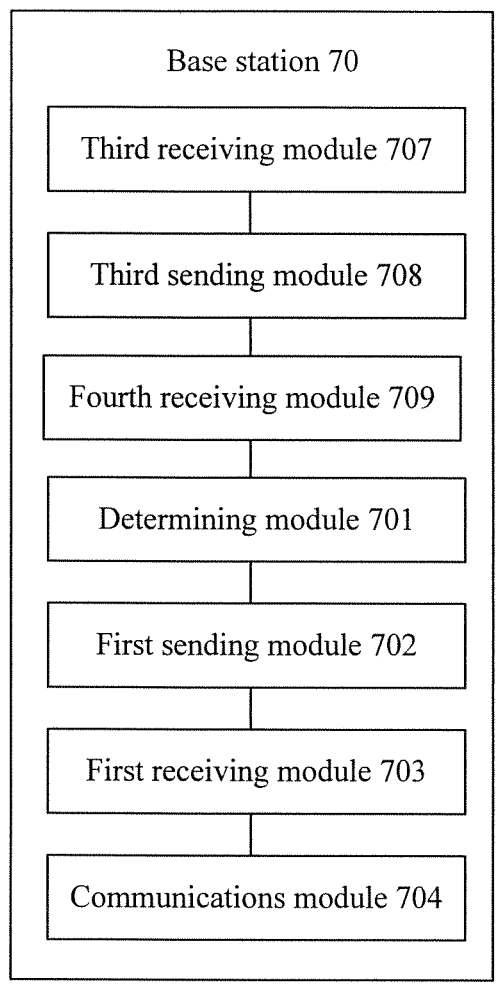
FIG. 7B is a structural diagram of a base station according to an embodiment of the present invention.

(2) The First Unlicensed Frequency Band is Determined by the Mobility Management Entity Correspondingly, the mode request message includes the first unlicensed frequency band; and as shown in FIG. 7B, the base station 70 further includes:

a third receiving module 707, configured to receive, before the determining module 701 determines to use the unlicensed spectrum to perform data communication, capability information of the terminal that is sent by the terminal;

a third sending module 708, configured to send the capability information of the terminal and capability information of the base station to the mobility management entity, so that the mobility management entity determines the first unlicensed frequency band according to the capability information of the base station and the capability information of the terminal, where the capability information of the terminal includes all the unlicensed frequency bands supported by the terminal, and the capability information of the base station includes all the unlicensed frequency bands supported by the base station; and a fourth receiving module 709, configured to receive the mode request message sent by the mobility management entity.

Figure 7C:
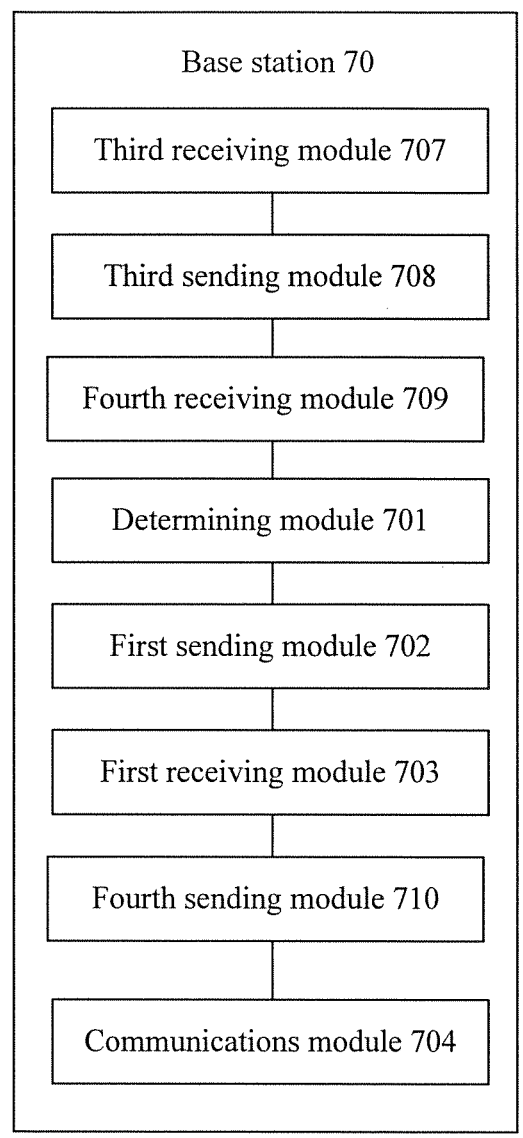
FIG. 7C is a structural diagram of a base station according to an embodiment of the present invention.

Further, as shown in FIG. 7C, the base station 70 further includes:

a fourth sending module 710, configured to send, after the first receiving module 703 receives the mode acknowledgement message sent by the terminal, and before the communications module 704 performs data communication in the first unlicensed frequency band with the terminal, the mode acknowledgement message to the mobility management entity, so that the mobility management entity establishes a data transmission link, where the mode acknowledgement message is used to indicate that the base station and the terminal determine to use the unlicensed spectrum to perform data communication.

Figure 7D:
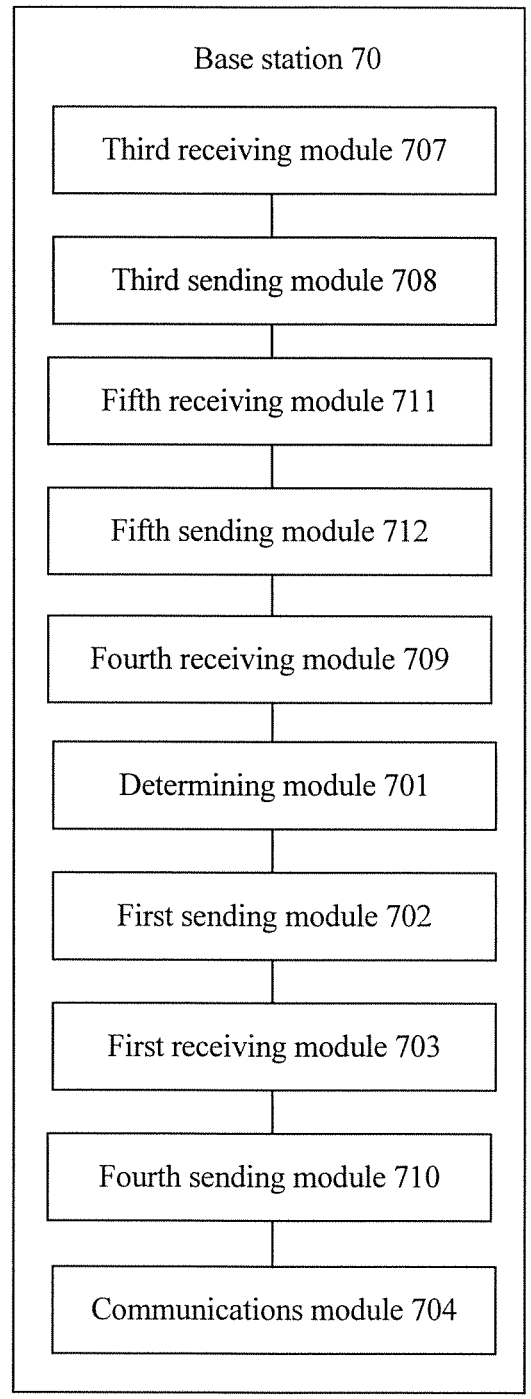
FIG. 7D is a structural diagram of a base station according to an embodiment of the present invention.

Further, as shown in FIG. 7D, the base station 70 further includes:

a fifth receiving module 711, configured to receive, after the third sending module 708 sends the capability information of the terminal and the capability information of the base station to the mobility management entity, and before the fourth receiving module 709 receives the mode request message sent by the mobility management entity, a service request message sent by the terminal; and a fifth sending module 712, configured to send the service request message to the mobility management entity, so that the mobility management entity sends the mode request message to the base station.

The service request message may include information about pre-using the unlicensed spectrum to perform data communication by the terminal. The terminal determines, according to a type of service requested by the terminal and a third option in the preset configuration table, that the terminal pre-uses the unlicensed spectrum to perform data communication.

As can be learned from above, a base station 70 provided by the embodiment of the present invention determines to use an unlicensed spectrum to perform data communication; the base station sends mode request information to a terminal, so that the terminal determines, according to a preset configuration table, that the terminal uses the unlicensed spectrum to perform data communication; and the base station receives mode acknowledgement information sent by the terminal, and performs data communication in a first unlicensed frequency band with the terminal, where the first unlicensed frequency band is any unlicensed frequency band in an intersection of all unlicensed frequency bands supported by the terminal and all unlicensed frequency bands supported by the base station, and is determined by the terminal or a mobility management entity. Therefore, through negotiation between the base station and the terminal or among the mobility management entity, the base station, and the terminal, an unlicensed spectrum resource is properly scheduled for data communication in a cellular system, and a problem that random access to the unlicensed spectrum easily causes interference between a licensed spectrum and the unlicensed spectrum in the prior art is avoided.

Embodiment 8

Figure 8:
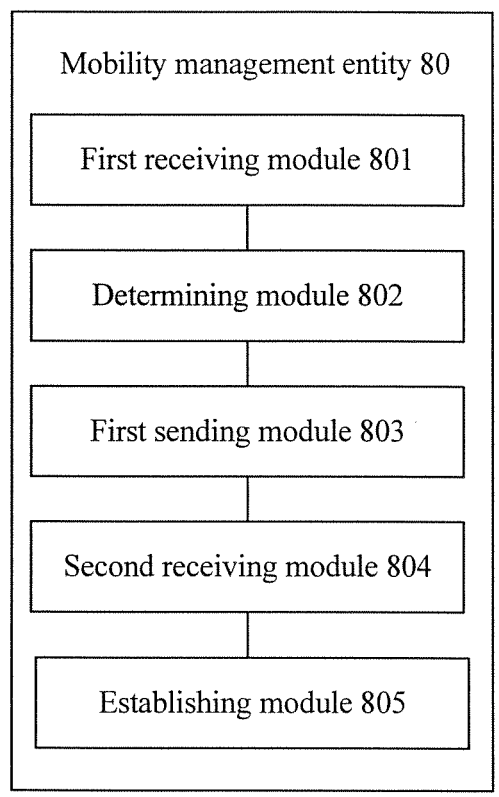
FIG. 8 is a structural diagram of a mobility management entity according to an embodiment of the present invention.

FIG. 8 is a structural diagram of a mobility management entity 80 according to the embodiment of the present invention. As shown in FIG. 8, the mobility management entity 80 includes a first receiving module 801, a determining module 802, a first sending module 803, a second receiving module 804, and an establishing module 805.

The first receiving module 801 is configured to receive capability information of the terminal and capability information of a base station that are sent by the base station.

The capability information of the terminal includes all unlicensed frequency bands supported by the terminal, and the capability information of the base station includes all unlicensed frequency bands supported by the base station.

The determining module 802 is configured to determine a first unlicensed frequency band according to the capability information of the terminal and the capability information of the base station.

The first sending module 803 is configured to send a mode request message to the base station, so that the base station determines to use an unlicensed spectrum to perform data communication and sends the mode request message to the terminal.

The mode request message includes the first unlicensed frequency band.

The second receiving module 804 is configured to receive a mode acknowledgement message sent by the base station.

The mode acknowledgement message is used to indicate that the base station and the terminal determine to use the unlicensed spectrum to perform data communication.

The establishing module 805 is configured to establish a data transmission link, so that the base station and the terminal perform data communication in the first unlicensed frequency band.

Further, the determining module 802 is specifically configured to determine the first unlicensed frequency band in the following manners, but is not limited thereto:

(1) selecting any unlicensed frequency band from an intersection of all the unlicensed frequency bands supported by the terminal and all the unlicensed frequency bands supported by the base station, as the first unlicensed frequency band; and (2) viewing usage of the unlicensed frequency bands supported by the base station, and selecting a relatively idle unlicensed frequency band as the first unlicensed frequency band.

Figure 8A:
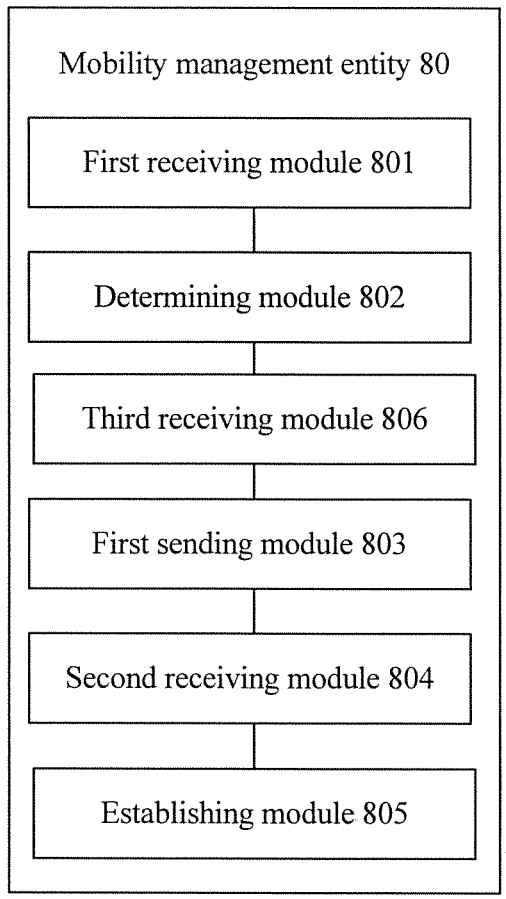
FIG. 8A is a structural diagram of a mobility management entity according to an embodiment of the present invention.

Further, as shown in FIG. 8A, the mobility management entity 80 further includes:

a third receiving module 806, configured to receive, after the determining module 802 determines the first unlicensed frequency band, and before the first sending module 803 sends the mode request message to the base station, a service request message sent by the base station, where the service request message is sent by the terminal.

The service request message may include information about pre-using the unlicensed spectrum to perform data communication by the terminal. The terminal determines, according to a type of service requested by the terminal and a third option in the preset configuration table, that the terminal pre-uses the unlicensed spectrum to perform data communication.

As can be learned from above, a mobility management entity 80 provided by the embodiment of the present invention receives capability information of the terminal and capability information of a base station that are sent by the base station, and stores the capability information of the terminal and the capability information of the base station; the mobility management entity receives a service request message sent by the base station; the mobility management entity determines a first unlicensed frequency band according to the capability information of the terminal and the capability information of the base station; the mobility management entity sends a mode request message to the base station, so that the base station stores the first unlicensed frequency band and sends the mode request message to the terminal after the base station determines to use an unlicensed spectrum to perform data communication, and further that the terminal determines, according to a preset configuration table, to use the unlicensed spectrum to perform data communication; the mobility management entity receives a mode acknowledgement message sent by the base station; and the mobility management entity establishes a data transmission link, so that the base station and the terminal perform data communication in the first unlicensed frequency band. Therefore, through negotiation among the mobility management entity, the base station, and the terminal, an unlicensed spectrum resource is properly scheduled for data communication in a cellular system, and a problem that random access to the unlicensed spectrum easily causes interference between a licensed spectrum and the unlicensed spectrum in the prior art is avoided.

Embodiment 9

Figure 9:
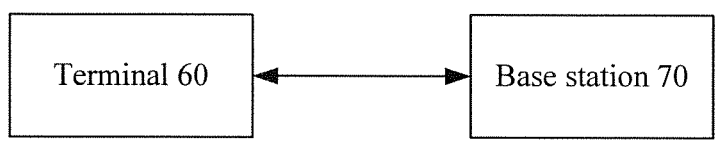
FIG. 9 is a structural diagram of a communications system according to an embodiment of the present invention.

FIG. 9 is a structural diagram of a communications system 90 according to the embodiment of the present invention. As shown in FIG. 9, the communications system 90 includes a terminal 60 and a base station 70.

Functions of the terminal 60 and the base station 70 are the same as those described in Embodiment 6 and Embodiment 7, and are not further described herein.

As can be learned from above, in a communications system 90 provided by the embodiment of the present invention, a base station sends a system broadcast message to a terminal, where the system broadcast message is used to indicate that the base station supports an unlicensed spectrum for performing data communication; the terminal sends a report message to the base station, where the report message is used to indicate that the terminal supports the unlicensed spectrum for performing data communication; the base station determines to use the unlicensed spectrum to perform data communication, and sends mode request information to the terminal; the terminal receives the mode request message sent by the base station, determines, according to a preset configuration table, that the terminal uses the unlicensed spectrum to perform data communication, determines a first unlicensed frequency band, and sends a mode acknowledgement message to the base station, where the mode acknowledgement message includes the first unlicensed frequency band; and the base station performs data communication in the first unlicensed frequency band with the terminal. Therefore, through negotiation between the base station and the terminal, an unlicensed spectrum resource is properly scheduled for data communication in a cellular system, and a problem that random access to the unlicensed spectrum easily causes interference between a licensed spectrum and the unlicensed spectrum in the prior art is avoided.

Embodiment 10

Figure 10:
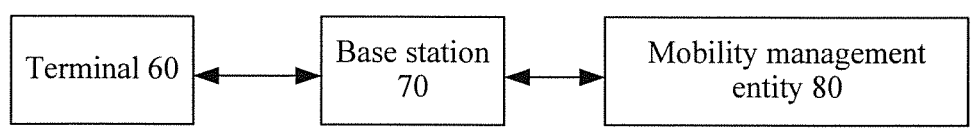
FIG. 10 is a structural diagram of a communications system according to an embodiment of the present invention.

FIG. 10 is a structural diagram of a communications system 100 according to the embodiment of the present invention. As shown in FIG. 10, the communications system 100 includes a terminal 60, a base station 70, and a mobility management entity 80.

Functions of the terminal 60, the base station 70, and the mobility management entity 80 are the same as those described in Embodiment 6, Embodiment 7, and Embodiment 8, and are not further described herein.

As can be learned from above, in a communications system 100 provided by the embodiment of the present invention, a terminal sends capability information of the terminal to a base station; the base station sends the capability information of the terminal and capability information of the base station to a mobility management entity; the mobility management entity stores the capability information of the terminal and the capability information of the base station; the mobility management entity determines a first unlicensed frequency band according to the capability information of the terminal and the capability information of the base station, and sends a mode request message to the base station; the base station determines to use an unlicensed spectrum to perform data communication, and sends the mode request message to the terminal; the terminal determines, according to a preset configuration table, to use the unlicensed spectrum to perform data communication, and sends a mode acknowledgement message to the base station; the base station sends the mode acknowledgement message to the mobility management entity; and the mobility management entity establishes a data transmission link, so that the base station and the terminal perform data communication in the first unlicensed frequency band. Therefore, through negotiation among the mobility management entity, the base station, and the terminal, an unlicensed spectrum resource is properly scheduled for data communication in a cellular system, and a problem that random access to the unlicensed spectrum easily causes interference between a licensed spectrum and the unlicensed spectrum in the prior art is avoided.

Embodiment 11

Figure 11:
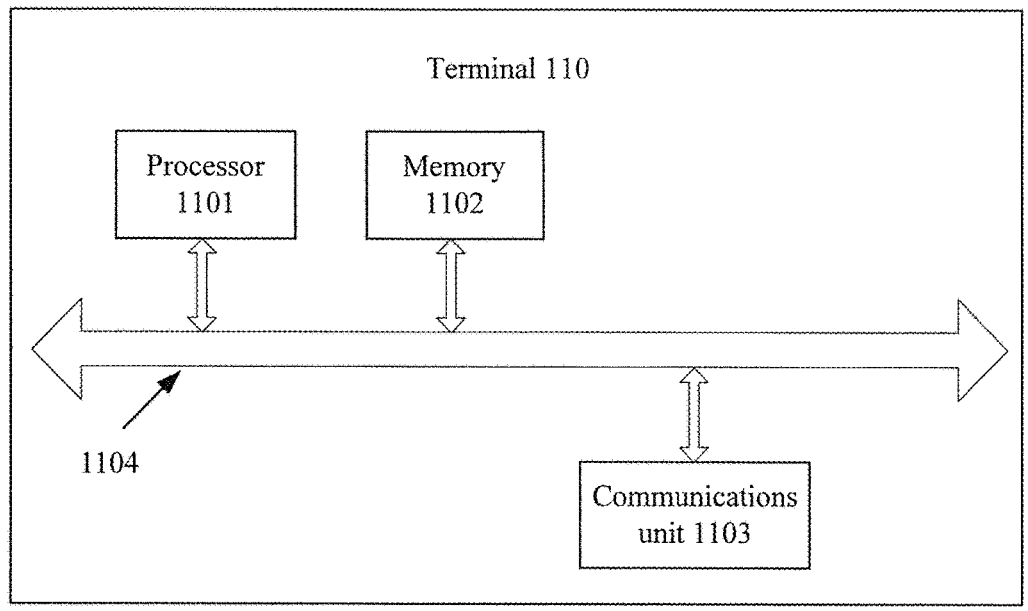
FIG. 11 is a structural diagram of a terminal according to an embodiment of the present invention.

Referring to FIG. 11, FIG. 11 shows a terminal 110 according to the embodiment of the present invention. As shown in FIG. 11, the terminal 110 may include a processor 1101, a memory 1102, a communications unit 1103, and at least one communications bus 1104 configured to implement connections and mutual communication between the apparatuses.

The processor 1101 may be a central processing unit (English: central processing unit, CPU for short).

The memory 1102 may be a volatile memory (English: volatile memory), for example, a random access memory (English: random-access memory, RAM for short); the memory may also be a non-volatile memory (English: non-volatile memory), for example, a read-only memory (English: read-only memory, ROM for short), a flash memory (English: flash memory), a hard disk drive (English: hard disk drive, HDD for short), or a solid-state drive (English: solid-state drive, SSD for short); the memory may be a combination of the foregoing types of memories, and provides an instruction and data for the processor 1101.

The communications unit 1103 is configured to receive a mode request message sent by a base station.

The mode request message is used to request the terminal to use an unlicensed spectrum to perform data communication.

The processor 1101 is configured to determine, according to a preset configuration table, whether the terminal uses the unlicensed spectrum to perform data communication.

The communications unit 1103 is further configured to: if the terminal determines to use the unlicensed spectrum to perform data communication, send a mode acknowledgement message to the base station, where the mode acknowledgement message is used to indicate that the terminal determines to use the unlicensed spectrum to perform data communication; and perform data communication in a first unlicensed frequency band with the base station, where the first unlicensed frequency band is any unlicensed frequency band in an intersection of all unlicensed frequency bands supported by the terminal and all unlicensed frequency bands supported by the base station.

The first unlicensed frequency band is any unlicensed frequency band in the intersection of all the unlicensed frequency bands supported by the terminal and all the unlicensed frequency bands supported by the base station. For example, if all the unlicensed frequency bands supported by the base station are 2.4 G, 5.8 G, and 60 G, and the unlicensed frequency bands supported by the terminal are 2.4 G, 5.8 G, and 40 G the terminal or a mobility management entity selects a frequency band from 2.4 G and 5.8 G as the first unlicensed frequency band. It should be noted that, in the embodiment of the present invention, the intersection of all the unlicensed frequency bands supported by the terminal and all the unlicensed frequency bands supported by the base station includes at least one unlicensed frequency band.

Further, the preset configuration table includes a first option, a second option, and a third option, where the first option includes an enabling status of an unlicensed spectrum mode, the second option includes a preset priority order of the unlicensed spectrum mode and a first communication mode, and the third option includes a preset priority order of, corresponding to a data service type, the unlicensed spectrum mode and the first communication mode, where the first communication mode includes a licensed spectrum mode and a WiFi mode, or a licensed spectrum mode, or a WiFi mode.

Correspondingly, the processor 1101 is specifically configured to:

query the first option in the preset configuration table;

if the unlicensed spectrum mode in the first option is in an enabled state, view the second option or the third option in the preset configuration table; and if the unlicensed spectrum mode in all modes that are in enabled states in the second option has a highest priority, or if the unlicensed spectrum mode in all modes that are in enabled states in the priority order corresponding to the data service type in the third option has a highest priority, determine that the terminal uses the unlicensed spectrum to perform data communication.

Preferably, the first option is a service enabling option, and may include the enabling status of the unlicensed spectrum mode (Cellular-U), an enabling status of the licensed spectrum mode (Cellular), and an enabling status of the WiFi mode. The terminal may determine an enabling status of a mode according to an input command of a user. Preferably, user equipment may click a preset configuration button corresponding to a mode on a user interface of the terminal to determine an enabling status of the mode. For example, the interface of the terminal displays an ON button and an OFF button of the unlicensed mode, and the user equipment may click the ON button to set the unlicensed mode to the enabled state.

The second option may include the preset priority order of the unlicensed spectrum mode, the licensed spectrum mode, and the WiFi mode. Preferably, the preset priority order in the second option may be any one of the following four configurations:

(1) default configuration: WiFi>Cellular-U>Cellular;
(2) advanced configuration: Cellular-U>WiFi>Cellular;
(3) intermediate configuration: WiFi>Cellular-U>Cellular; or
(4) low configuration: WiFi>Cellular>Cellular-U.

It should be noted that, the modes in each configuration are sorted according to a descending order of priorities, where the priority order in each configuration is set according to a terminal requirement and is not limited herein in the embodiment of the present invention.

The third option may include the preset priority order of the unlicensed spectrum mode, the licensed spectrum mode, and the WiFi mode, corresponding to the data service type. For example, a priority order (descending order) of the modes, corresponding to a video service, is WiFi, Cellular- U, and Cellular; a priority order (descending order) corresponding to a web browse service is Cellular-U, WiFi, and Cellular.

The following uses an example to describe a specific process in which the processor 1101 determines, according to a preset configuration table (Table 1), whether the terminal uses the unlicensed spectrum to perform data communication, where priorities in the second option and the third option in Table 1 are sorted according to the descending order.

The processor 1101 queries the first option in Table 1, and learns that Cellular-U (unlicensed mode) and Cellular (licensed mode) are in the enabled states; and the processor views the second option in Table 1, and learns that in Cellular-U and Cellular that are in the enabled states, a priority of Cellular-U is higher than that of Cellular, that is, Cellular-U has a higher priority, and therefore, determines that the terminal uses the unlicensed spectrum to perform data communication; or assuming that the terminal browses web pages when performing a data transmission service with the base station, the processor views the third option in Table 1, and learns that in Cellular-U and Cellular that are in the enabled states in the priority order corresponding to web browse, a priority of Cellular-U is higher than that of Cellular, that is, Cellular-U has a highest priority, and therefore, determines that the terminal uses the unlicensed spectrum to perform data communication.

Further, the processor 1101 is further configured to:

if the unlicensed spectrum mode in the first option in the preset configuration table is in a disabled state; or if the unlicensed spectrum mode in the first option in the preset configuration table is in the enabled state, and the unlicensed spectrum mode in all modes that are in the enabled states in the second option does not have a highest priority, or the unlicensed spectrum mode in all modes that are in the enabled states in the priority order corresponding to the data service type in the third option does not have a highest priority, determine that the terminal cannot use the unlicensed spectrum to perform data communication.

In the embodiment of the present invention, the first unlicensed frequency band may be determined by the terminal (User Equipment, UE) or the mobility management entity (Mobility Management Entity, MME). The two cases are hereinafter described separately.

(1) The First Unlicensed Frequency Band is Determined by the Terminal

Further, the mode acknowledgement message includes the first unlicensed frequency band, and the mode request message includes all the unlicensed frequency bands supported by the base station.

Correspondingly, the processor is further configured to:

after the processor 1101 determines to use the unlicensed spectrum to perform data communication, and before the communications unit 1103 sends the mode acknowledgement information to the base station, select the first unlicensed frequency band from the intersection of all the unlicensed frequency bands supported by the terminal and all the unlicensed frequency bands supported by the base station.

Further, the communications unit 1103 is further configured to: before the communications unit 1103 receives the mode request message sent by the base station, receive a system broadcast message sent by the base station, where the system broadcast message is used to indicate that the base station supports the unlicensed spectrum for performing data communication; and send a report message to the base station, so that the base station sends the mode request message to the terminal, where the report message is used to indicate that the terminal supports the unlicensed spectrum for performing data communication.

Preferably, the communications unit 1103 may send the report message to the base station by using a random access channel (Random Access Channel, RACH).

(2) The First Unlicensed Frequency Band is Determined by the Mobility Management Entity Further, the mode request message includes the first unlicensed frequency band.

Correspondingly, the communications unit 1103 is further configured to send, before the communications unit 1103 receives the mode request message sent by the base station, capability information of the terminal to the base station, so that the base station sends the capability information of the terminal and capability information of the base station to the mobility management entity, and further that the mobility management entity determines the first unlicensed frequency band according to the capability information of the terminal and the capability information of the base station, where the capability information of the terminal includes all the unlicensed frequency bands supported by the terminal, and the capability information of the base station includes all the unlicensed frequency bands supported by the base station.

Further, the communications unit 1103 is further configured to: after the communications unit 1103 sends the capability information of the terminal, and before the communications unit 1103 receives the mode request message sent by the base station, send a service request message to the base station, so that the base station sends the service request message to the mobility management entity, and further that the mobility management entity sends the mode request message to the base station.

As can be learned from above, a terminal 110 provided by the embodiment of the present invention receives a mode request message sent by a base station, and determines, according to a preset configuration table, whether the terminal uses an unlicensed spectrum to perform data communication; and if determining to use the unlicensed spectrum to perform data communication, the terminal sends a mode acknowledgement message to the base station, and performs data communication in a first unlicensed frequency band with the terminal, where the first unlicensed frequency band is any unlicensed frequency band in an intersection of all unlicensed frequency bands supported by the terminal and all unlicensed frequency bands supported by the base station, and is determined by the terminal or a mobility management entity. Therefore, through negotiation between the base station and the terminal or among the mobility management entity, the base station, and the terminal, an unlicensed spectrum resource is properly scheduled for data communication in a cellular system, and a problem that random access to the unlicensed spectrum easily causes interference between a licensed spectrum and the unlicensed spectrum in the prior art is avoided.

Embodiment 12

Figure 12:
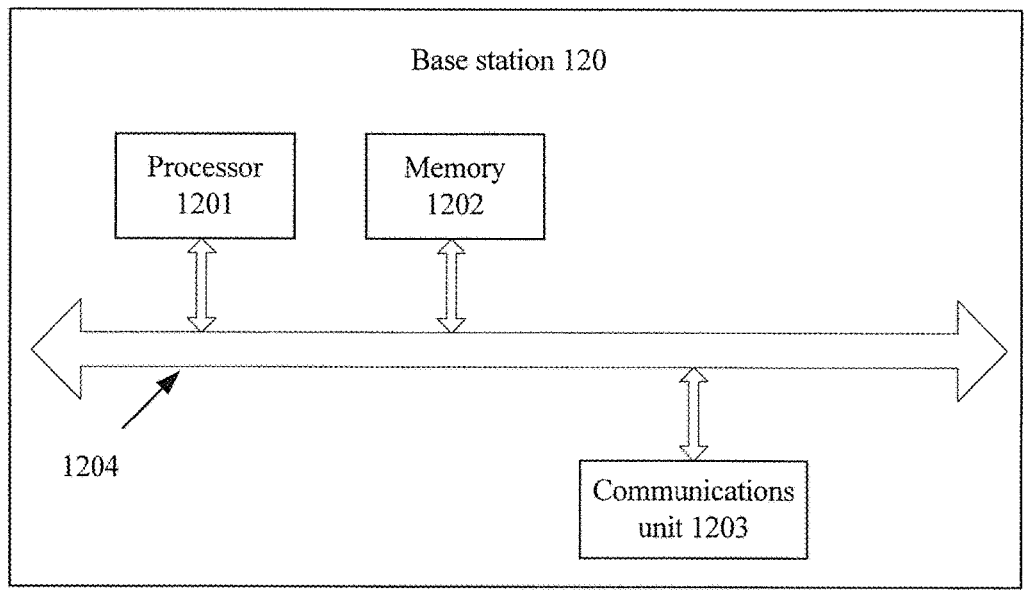
FIG. 12 is a structural diagram of a base station according to an embodiment of the present invention.

Referring to FIG. 12, FIG. 12 shows a base station 120 according to the embodiment of the present invention. As shown in FIG. 12, the base station 120 may include a processor 1201, a memory 1202, a communications unit 1203, and at least one communications bus 1204 configured to implement connections and mutual communication between the apparatuses.

The processor 1201 may be a central processing unit (English: central processing unit, CPU for short).

The memory 1202 may be a volatile memory (English: volatile memory), for example, a random access memory (English: random-access memory, RAM for short); the memory may also be a non-volatile memory (English: non-volatile memory), for example, a read-only memory (English: read-only memory, ROM for short), a flash memory (English: flash memory), a hard disk drive (English: hard disk drive, HDD for short), or a solid-state drive (English: solid-state drive, SSD for short); the memory may be a combination of the foregoing types of memories, and provides an instruction and data for the processor 1201.

The communications unit 1203 is configured to perform data transmission with an external network element.

The processor 1201 is configured to determine to use an unlicensed spectrum to perform data communication.

The communications unit 1203 is configured to send mode request information to a terminal, where the mode request information is used to request the terminal to use the unlicensed spectrum to perform data communication;

receive mode acknowledgement information sent by the terminal, where the mode acknowledgement message is used to indicate that the terminal determines to use the unlicensed spectrum to perform data communication; and perform data communication in a first unlicensed frequency band with the terminal.

The first unlicensed frequency band is any unlicensed frequency band in an intersection of all unlicensed frequency bands supported by the terminal and all unlicensed frequency bands supported by the base station.

Further, the processor 1201 is specifically configured to:
detect an unused licensed spectrum resource; and
if the unused licensed spectrum resource is smaller than a spectrum resource required for performing data communication with the terminal, determine to use the unlicensed spectrum to perform data communication.

The spectrum resource required for performing data communication between the base station and the terminal may be determined by the processor 1201 in the following two manners:

(1) when the terminal needs to transmit uplink data, the processor 1201 determines, according to an amount of data that the terminal needs to transmit, which is periodically reported by the terminal, the spectrum resource required for performing data communication with the terminal; and (2) when the base station needs to transmit downlink data to the terminal, the processor 1201 determines, by periodically detecting a data buffer size corresponding to the terminal, the resource required for performing data communication with the terminal.

In the embodiment of the present invention, the first unlicensed frequency band may be determined by the terminal (User Equipment, UE) or a mobility management entity (Mobility Management Entity, MME). The two cases are hereinafter further described separately.

(1) The First Unlicensed Frequency Band is Determined by the Terminal

Further, the mode acknowledgement message includes the first unlicensed frequency band.

Correspondingly, the communications unit 1203 is further configured to: before the processor 1201 determines to use the unlicensed spectrum to perform data communication, send a system broadcast message to the terminal, where the system broadcast message is used to indicate that the base station supports the unlicensed spectrum for performing data communication; and receive a report message sent by the terminal, where the report message is used to indicate that the terminal supports the unlicensed spectrum for performing data communication.

Preferably, the communications unit 1203 may send the system broadcast message to the terminal by using a system message block in a physical broadcast channel.

(2) The First Unlicensed Frequency Band is Determined by the Mobility Management Entity Further, the mode request message includes the first unlicensed frequency band.

Correspondingly, the communications unit 1203 is further configured to: before the processor 1201 determines to use the unlicensed spectrum to perform data communication, receive capability information of the terminal that is sent by the terminal;

send the capability information of the terminal and capability information of the base station to the mobility management entity, so that the mobility management entity determines the first unlicensed frequency band according to the capability information of the base station and the capability information of the terminal, where the capability information of the terminal includes all the unlicensed frequency bands supported by the terminal, and the capability information of the base station includes all the unlicensed frequency bands supported by the base station; and receive the mode request message sent by the mobility management entity.

Further, the communications unit 1203 is further configured to: after the communications unit 1203 receives the mode acknowledgement message sent by the terminal, and before data communication is performed in the first unlicensed frequency band with the terminal, send the mode acknowledgement message to the mobility management entity, so that the mobility management entity establishes a data transmission link, where the mode acknowledgement message is used to indicate that the base station and the terminal determine to use the unlicensed spectrum to perform data communication.

Further, the communications unit 1203 is further configured to: after the communications unit 1203 sends the capability information of the terminal and the capability information of the base station to the mobility management entity, and before the mode request message sent by the mobility management entity is received, receive a service request message sent by the terminal; and send the service request message to the mobility management entity, so that the mobility management entity sends the mode request message to the base station.

The service request message may include information about pre-using the unlicensed spectrum to perform data communication by the terminal. The terminal determines, according to a type of service requested by the terminal and a third option in the preset configuration table, that the terminal pre-uses the unlicensed spectrum to perform data communication.

As can be learned from above, a base station 120 provided by the embodiment of the present invention determines to use an unlicensed spectrum to perform data communication; the base station sends mode request information to a terminal, so that the terminal determines, according to a preset configuration table, that the terminal uses the unlicensed spectrum to perform data communication; and the base station receives mode acknowledgement information sent by the terminal, and performs data communication in a first unlicensed frequency band with the terminal, where the first unlicensed frequency band is any unlicensed frequency band in an intersection of all unlicensed frequency bands supported by the terminal and all unlicensed frequency bands supported by the base station, and is determined by the terminal or a mobility management entity. Therefore, through negotiation between the base station and the terminal or among the mobility management entity, the base station, and the terminal, an unlicensed spectrum resource is properly scheduled for data communication in a cellular system, and a problem that random access to the unlicensed spectrum easily causes interference between a licensed spectrum and the unlicensed spectrum in the prior art is avoided.

Embodiment 13

Figure 13:
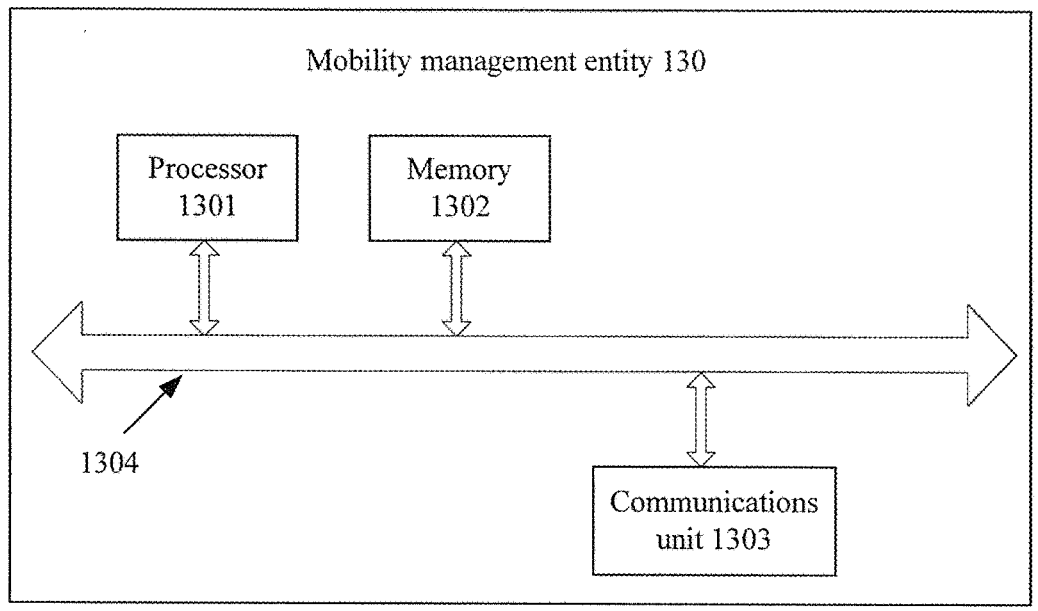
FIG. 13 is a structural diagram of a mobility management entity according to an embodiment of the present invention.

Referring to FIG. 13, FIG. 13 shows a mobility management entity 130 according to the embodiment of the present invention. As shown in FIG. 13, the mobility management entity 130 may include a processor 1301, a memory 1302, a communications unit 1303, and at least one communications bus 1304 configured to implement connections and mutual communication between the apparatuses.

The processor 1301 may be a central processing unit (English: central processing unit, CPU for short).

The memory 1302 may be a volatile memory (English: volatile memory), for example, a random access memory (English: random-access memory, RAM for short); the memory may also be a non-volatile memory (English: non-volatile memory), for example, a read-only memory (English: read-only memory, ROM for short), a flash memory (English: flash memory), a hard disk drive (English: hard disk drive, HDD for short), or a solid-state drive (English: solid-state drive, SSD for short); the memory may be a combination of the foregoing types of memories, and provides an instruction and data for the processor 1301.

The communications unit 1303 is configured to receive capability information of the terminal and capability information of a base station that are sent by the base station.

The capability information of the terminal includes all unlicensed frequency bands supported by the terminal, and the capability information of the base station includes all unlicensed frequency bands supported by the base station.

The processor 1301 is configured to determine a first unlicensed frequency band according to the capability information of the terminal and the capability information of the base station.

The communications unit 1303 is further configured to send a mode request message to the base station, so that the base station determines to use an unlicensed spectrum to perform data communication and sends the mode request message to the terminal, where the mode request message includes the first unlicensed frequency band; and receive a mode acknowledgement message sent by the base station, where the mode acknowledgement message is used to indicate that the base station and the terminal determine to use the unlicensed spectrum to perform data communication.

The processor 1301 is further configured to establish a data transmission link, so that the base station and the terminal perform data communication in the first unlicensed frequency band.

Further, the processor 1301 is specifically configured to determine the first unlicensed frequency band in the following manners, but is not limited thereto:

(1) selecting any unlicensed frequency band from an intersection of all the unlicensed frequency bands supported by the terminal and all the unlicensed frequency bands supported by the base station, as the first unlicensed frequency band; and (2) viewing usage of the unlicensed frequency bands supported by the base station, and selecting a relatively idle unlicensed frequency band as the first unlicensed frequency band.

Further, the communications unit 1303 is further configured to: after the processor 1301 determines the first unlicensed frequency band, and before the communications unit 1303 sends the mode request message to the base station, receive a service request message sent by the base station, where the service request message is sent by the terminal.

The service request message may include information about pre-using the unlicensed spectrum to perform data communication by the terminal. The terminal determines, according to a type of service requested by the terminal and a third option in the preset configuration table, that the terminal pre-uses the unlicensed spectrum to perform data communication.

As can be learned from above, a mobility management entity 130 provided by the embodiment of the present invention receives capability information of the terminal and capability information of a base station that are sent by the base station, and stores the capability information of the terminal and the capability information of the base station; the mobility management entity receives a service request message sent by the base station; the mobility management entity determines a first unlicensed frequency band according to the capability information of the terminal and the capability information of the base station; the mobility management entity sends a mode request message to the base station, so that the base station stores the first unlicensed frequency band and sends the mode request message to the terminal after the base station determines to use an unlicensed spectrum to perform data communication, and further that the terminal determines, according to a preset configuration table, to use the unlicensed spectrum to perform data communication; the mobility management entity receives a mode acknowledgement message sent by the base station; and the mobility management entity establishes a data transmission link, so that the base station and the terminal perform data communication in the first unlicensed frequency band. Therefore, through negotiation among the mobility management entity, the base station, and the terminal, an unlicensed spectrum resource is properly scheduled for data communication in a cellular system, and a problem that random access to the unlicensed spectrum easily causes interference between a licensed spectrum and the unlicensed spectrum in the prior art is avoided.

Embodiment 14

Figure 14:
FIG. 14 is a structural diagram of a communications system according to an embodiment of the present invention.

FIG. 14 is a structural diagram of a communications system 140 according to the embodiment of the present invention. As shown in FIG. 14, the communications system 140 includes a terminal 110 and a base station 120.

Functions of the terminal 110 and the base station 120 are the same as those described in Embodiment 11 and Embodiment 12, and are not further described herein.

As can be learned from above, in a communications system 140 provided by the embodiment of the present invention, a base station sends a system broadcast message to a terminal, where the system broadcast message is used to indicate that the base station supports an unlicensed spectrum for performing data communication; the terminal sends a report message to the base station, where the report message is used to indicate that the terminal supports the unlicensed spectrum for performing data communication; the base station determines to use the unlicensed spectrum to perform data communication, and sends mode request information to the terminal; the terminal receives the mode request message sent by the base station, determines, according to a preset configuration table, that the terminal uses the unlicensed spectrum to perform data communication, determines a first unlicensed frequency band, and sends a mode acknowledgement message to the base station, where the mode acknowledgement message includes the first unlicensed frequency band; and the base station performs data communication in the first unlicensed frequency band with the terminal. Therefore, through negotiation between the base station and the terminal, an unlicensed spectrum resource is properly scheduled for data communication in a cellular system, and a problem that random access to the unlicensed spectrum easily causes interference between a licensed spectrum and the unlicensed spectrum in the prior art is avoided.

Embodiment 15

Figure 15:
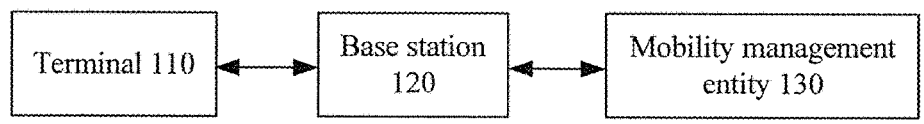
FIG. 15 is a structural diagram of a communications system according to an embodiment of the present invention.

FIG. 15 is a structural diagram of a communications system 150 according to the embodiment of the present invention. As shown in FIG. 15, the communications system 150 includes a terminal 110, a base station 120, and a mobility management entity 130.

Functions of the terminal 110, the base station 120, and the mobility management entity 130 are the same as those described in Embodiment 11, Embodiment 12, and Embodiment 13, and are not further described herein.

As can be learned from above, in a communications system 150 provided by the embodiment of the present invention, a terminal sends capability information of the terminal to a base station; the base station sends the capability information of the terminal and capability information of the base station to a mobility management entity; the mobility management entity stores the capability information of the terminal and the capability information of the base station; the mobility management entity determines a first unlicensed frequency band according to the capability information of the terminal and the capability information of the base station, and sends a mode request message to the base station; the base station determines to use an unlicensed spectrum to perform data communication, and sends the mode request message to the terminal; the terminal determines, according to a preset configuration table, to use the unlicensed spectrum to perform data communication, and sends a mode acknowledgement message to the base station; the base station sends the mode acknowledgement message to the mobility management entity; and the mobility management entity establishes a data transmission link, so that the base station and the terminal perform data communication in the first unlicensed frequency band. Therefore, through negotiation among the mobility management entity, the base station, and the terminal, an unlicensed spectrum resource is properly scheduled for data communication in a cellular system, and a problem that random access to the unlicensed spectrum easily causes interference between a licensed spectrum and the unlicensed spectrum in the prior art is avoided.

In the several embodiments provided in the present application, it should be understood that the disclosed system, mobile terminal, and method may be implemented in other manners. For example, the described mobile terminal embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the mobile terminal or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for performing data communication by using an unlicensed spectrum, the method comprising:
receiving, by a terminal, a mode request message sent by a base station, wherein the mode request message comprises all the unlicensed frequency bands supported by the base station and is used to request the terminal to use an unlicensed spectrum to perform data communication;
determining, by the terminal according to a preset configuration table, whether the terminal uses the unlicensed spectrum to perform data communication;
when determining to use the unlicensed spectrum to perform data communication, selecting, by the terminal, a first unlicensed frequency band from the intersection of all the unlicensed frequency bands supported by the terminal and all the unlicensed frequency bands supported by the base station;

sending, by the terminal, a mode acknowledgement message comprising the first unlicensed frequency band to the base station, for indicating that the terminal determines to use the unlicensed spectrum to perform data communication; and performing, by the terminal, communication in the first unlicensed frequency band with the base station, wherein the first unlicensed frequency band is any unlicensed frequency band in an intersection of all unlicensed frequency bands supported by the terminal and all unlicensed frequency bands supported by the base station.

2. The method according to claim 1, wherein:
the preset configuration table comprises a first option, a second option, and a third option, wherein the first option comprises an enabling status of an unlicensed spectrum mode, the second option comprises a preset priority order of the unlicensed spectrum mode and a first communication mode, and the third option comprises a preset priority order, corresponding to a data service type, of the unlicensed spectrum mode and the first communication mode, wherein the first communication mode comprises a licensed spectrum mode and a WiFi mode, or a licensed spectrum mode, or a WiFi mode; and
determining, by the terminal according to the preset configuration table, whether the terminal uses the unlicensed spectrum to perform data communication comprises:
querying the first option in the preset configuration table,
when the unlicensed spectrum mode in the first option is in an enabled state, querying the second option or the third option in the preset configuration table, and
when the unlicensed spectrum mode in all modes that are in enabled states in the second option has a highest priority, or if the unlicensed spectrum mode in all modes that are in enabled states in the priority order corresponding to the data service type in the third option has a highest priority, determining that the terminal uses the unlicensed spectrum to perform data communication.

3. The method according to claim 1, wherein before receiving the mode request message sent by the base station, the method further comprises:
receiving, by the terminal, a system broadcast message sent by the base station for indicating that the base station supports the unlicensed spectrum for performing data communication; and
sending, by the terminal, a report message to the base station, to enable the base station to send the mode request message to the terminal, wherein the report message is configured to indicate that the terminal supports the unlicensed spectrum for performing data communication.

4. The method according to claim 1, wherein:
the first unlicensed frequency band is determined by a mobility management entity, and the mode request message comprises the first unlicensed frequency band; and
correspondingly, before receiving the mode request message sent by the base station, the method further comprises:
sending, by the terminal, capability information of the terminal to the base station, to enable the base station to send the capability information of the terminal and capability information of the base station to the mobility management entity, and further that to enable the mobility management entity to determine the first unlicensed frequency band according to the capability information of the terminal and the capability information of the base station, wherein the capability information of the terminal comprises all the unlicensed frequency bands supported by the terminal, and the capability information of the base station comprises all the unlicensed frequency bands supported by the base station.

5. The method according to claim 4, wherein after sending, by the terminal, the capability information of the terminal to the base station, and before receiving the mode request message sent by the base station, the method further comprises:
sending, by the terminal, a service request message to the base station, to enable the base station to send the service request message to the mobility management entity, and further to enable the mobility management entity to send the mode request message to the base station, wherein the service request message is configured to indicate that the terminal will use the unlicensed spectrum to perform data communication by the terminal.

6. A method for performing data communication by using an unlicensed spectrum, the method comprising:
detecting, by a base station, an unused licensed spectrum resource;
when the unused licensed spectrum resource is smaller than a spectrum resource required for performing data communication with a terminal, determining, by the base station, to use an unlicensed spectrum to perform data communication;
sending, by the base station, mode request information to the terminal, for requesting the terminal to use the unlicensed spectrum to perform data communication;
receiving, by the base station, mode acknowledgement information sent by the terminal, for indicating that the terminal determines to use the unlicensed spectrum to perform data communication; and
performing, by the base station, data communication in a first unlicensed frequency band with the terminal, wherein the first unlicensed frequency band is any unlicensed frequency band in an intersection of all unlicensed frequency bands supported by the terminal and all unlicensed frequency bands supported by the base station.

7. The method according to claim 6, wherein:
the first unlicensed frequency band is determined by the terminal, and the mode acknowledgement message comprises the first unlicensed frequency band; and
correspondingly, before the base station determines to use the unlicensed spectrum to perform data communication, the method further comprises:
sending, by the base station, a system broadcast message, for indicating that the base station supports the unlicensed spectrum for performing data communication; and
receiving, by the base station, a report message sent by the terminal, for indicating that the terminal supports the unlicensed spectrum for performing data communication.

8. The method according to claim 6, wherein:
the first unlicensed frequency band is determined by a mobility management entity, and the mode request message comprises the first unlicensed frequency band; and correspondingly, before the base station determines to use the unlicensed spectrum to perform data communication, the method further comprises:

receiving, by the base station, capability information of the terminal that is sent by the terminal, and sending the capability information of the terminal and capability information of the base station to the mobility management entity, to enable the mobility management entity to determine the first unlicensed frequency band according to the capability information of the base station and the capability information of the terminal, wherein the capability information of the terminal comprises all the unlicensed frequency bands supported by the terminal, and the capability information of the base station comprises all the unlicensed frequency bands supported by the base station; and receiving, by the base station, the mode request message sent by the mobility management entity.

9. The method according to claim 8, wherein after the base station receives the mode acknowledgement message sent by the terminal, and before data communication is performed in the first unlicensed frequency band with the terminal, the method further comprises:

sending, by the base station, the mode acknowledgement message to the mobility management entity, to enable the mobility management entity to establish a data transmission link, wherein the mode acknowledgement message is configured to indicate that the base station and the terminal determine to use the unlicensed spectrum to perform data communication.

10. The method according to claim 8, wherein after the base station sends the capability information of the terminal and the capability information of the base station to the mobility management entity, and before the mode request message sent by the mobility management entity is received, the method further comprises:

receiving, by the base station, a service request message sent by the terminal, and sending the service request message to the mobility management entity, to enable the mobility management entity to send the mode request message to the base station, wherein the service request message comprises a message about pre-using the unlicensed spectrum to perform data communication by the terminal.

11. A terminal, comprising:

a transceiver, configured to receive a mode request message sent by a base station, wherein the mode request message comprises all the unlicensed frequency bands supported by the base station and is used to request the terminal to use an unlicensed spectrum to perform data communication; and a processor, configured to:
  determine, according to a preset configuration table, whether the terminal uses the unlicensed spectrum to perform data communication; and
  select a first unlicensed frequency band from the intersection of all the unlicensed frequency bands supported by the terminal and all the unlicensed frequency bands supported by the base station; wherein the transceiver is further configured to:
  when the terminal determines to use the unlicensed spectrum to perform data communication, send a mode acknowledgement message comprising the first unlicensed frequency band to the base station, for indicating that the terminal determines to use the unlicensed spectrum to perform data communication; and
  perform data communication in the first unlicensed frequency band with the base station, wherein the first unlicensed frequency band is any unlicensed frequency band in an intersection of all unlicensed frequency bands supported by the terminal and all unlicensed frequency bands supported by the base station.

12. A base station, comprising:

a processor, configured to:
  detect an unused licensed spectrum resource;
  when the unused licensed spectrum resource is smaller than a spectrum resource required for performing data communication with a terminal, determine to use an unlicensed spectrum to perform data communication; and a transceiver, configured to:
  send mode request information to the terminal, for requesting the terminal to use the unlicensed spectrum to perform data communication;
  receive mode acknowledgement information sent by the terminal, for indicating that the terminal determines to use the unlicensed spectrum to perform data communication; and
  perform data communication in a first unlicensed frequency band with the terminal, wherein the first unlicensed frequency band is any unlicensed frequency band in an intersection of all unlicensed frequency bands supported by the terminal and all unlicensed frequency bands supported by the base station.

* * * * *